United States Patent
Hattori et al.

(10) Patent No.: US 10,121,593 B2
(45) Date of Patent: Nov. 6, 2018

(54) COMPOSITE ELECTRONIC COMPONENT

(71) Applicant: Murata Manufacturing Co., Ltd., Nagaokakyo-shi, Kyoto-fu (JP)

(72) Inventors: Kazuo Hattori, Nagaokakyo (JP); Isamu Fujimoto, Nagaokakyo (JP); Shinichiro Kuroiwa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 78 days.

(21) Appl. No.: 15/176,564

(22) Filed: Jun. 8, 2016

(65) Prior Publication Data
US 2016/0372265 A1 Dec. 22, 2016

(30) Foreign Application Priority Data
Jun. 16, 2015 (JP) ................................. 2015-120845

(51) Int. Cl.
*H01G 4/40* (2006.01)
*H01G 4/30* (2006.01)
(Continued)

(52) U.S. Cl.
CPC ........... *H01G 4/30* (2013.01); *H01F 17/0013* (2013.01); *H01F 27/292* (2013.01); *H01G 4/005* (2013.01);
(Continued)

(58) Field of Classification Search
CPC .................................. H01G 4/30; H01G 4/228
See application file for complete search history.

(56) References Cited

U.S. PATENT DOCUMENTS

| 6,931,712 B2* | 8/2005 | Long ................. H01F 41/041 29/602.1 |
| 2008/0019081 A1* | 1/2008 | Kim ....................... H01G 2/06 361/535 |

(Continued)

FOREIGN PATENT DOCUMENTS

| JP | 6-283301 A | 10/1994 |
| JP | 07254764 A | * 10/1995 |

(Continued)

OTHER PUBLICATIONS

Official Communication issued in Korean Patent Application No. 10-2016-0074691, dated May 17, 2017.
(Continued)

*Primary Examiner* — Eric Thomas
(74) *Attorney, Agent, or Firm* — Keating & Bennett, LLP

(57) ABSTRACT

A composite electronic component includes a first and second electronic elements, and a joint material. The first electronic element includes a base member, and an upper surface conductor on an upper surface of the base member. The second electronic element includes an element body with a lower surface facing the upper surface of the base member, and a terminal conductor disposed on the lower surface of the element body. The joint material joins the upper surface conductor and the terminal conductor. The upper surface conductor includes a conductive layer in which a metal that is maximum in weight ratio is Ag. The lateral surface of the conductive layer is covered with conductive layers defining a protective metal film, and the metal that is maximum in weight ratio contained in the conductive layers defining a protective metal film is a metal other than Ag and Cu.

16 Claims, 18 Drawing Sheets

(51) Int. Cl.
  *H01G 4/248*  (2006.01)
  *H01G 4/005*  (2006.01)
  *H01G 4/12*   (2006.01)
  *H01F 17/00*  (2006.01)
  *H01F 27/29*  (2006.01)

(52) U.S. Cl.
  CPC .............. *H01G 4/12* (2013.01); *H01G 4/248* (2013.01); *H01G 4/40* (2013.01)

(56) References Cited

U.S. PATENT DOCUMENTS

| | | | |
|---|---|---|---|
| 2013/0284507 A1* | 10/2013 | Hattori | H05K 1/18 174/260 |
| 2014/0124256 A1 | 5/2014 | Hattori et al. | |
| 2015/0122534 A1* | 5/2015 | Park | H01G 2/065 174/260 |
| 2016/0309578 A1* | 10/2016 | Park | H01G 4/30 |

FOREIGN PATENT DOCUMENTS

| | | |
|---|---|---|
| JP | 2001-338838 A | 12/2001 |
| KR | 10-2014-0027450 A | 3/2014 |
| WO | 2014/115358 A1 | 7/2014 |

OTHER PUBLICATIONS

Hattori et al.; "Composite Electronic Component and Resistor"; U.S. Appl. No. 15/042,236, filed Feb. 12, 2016.
Hattori et al., "Composite Electronic Component and Resistance Element", U.S. Appl. No. 15/205,120, filed Jul. 8, 2016.
Hattori et al., "Composite Electronic Component and Resistance Element", U.S. Appl. No. 15/205,124, filed Jul. 8, 2016.
Hattori et al., "Composite Electronic Component and Resistance Element", U.S. Appl. No. 15/205,128, filed Jul. 8, 2016.

* cited by examiner

COMPOSITE ELECTRONIC COMPONENT

CROSS REFERENCE TO RELATED APPLICATIONS

This application claims the benefit of priority to Japanese Patent Application 2015-120845 filed Jun. 16, 2015, the entire contents of which are incorporated herein by reference.

BACKGROUND OF THE INVENTION

1. Field of the Invention

The present invention relates to a composite electronic component including a plurality of electronic elements.

2. Description of the Related Art

Conventionally, several inventions have been proposed regarding a composite electronic component having multiple electronic elements from the view point of high integration of electronic components on a wiring substrate.

For example, JP-A 2001-338838 discloses a composite electronic component consisting of a capacitor and a resistor. In this composite electronic component, the resistor is disposed on the surface of a capacitor body of a chip capacitor, and the resistor and a pair of external electrodes disposed on the surface of the capacitor body are connected with each other.

JP-A 6-283301 discloses a composite electronic component in which two or more rectangular parallelepiped chip elements having the same shape and the same dimension selected from the group consisting of a chip resistance, a chip thermistor, a chip capacitor and a chip varistor are overlapped one another in the thickness direction of these, and terminal electrodes provided in these are collectively covered with a lead frame to integrate the same.

The inventors proposed in Japanese Patent Application No. 2015-049457 (U.S. patent application Ser. No. 15/042, 236) a composite electronic component capable of improving the degree of freedom in circuit design compared with those disclosed in JP-A 6-283301 and Japanese Patent Application No. 2015-049457 (U.S. patent application Ser. No. 15/042,236). The composite electronic component is a composite electronic component having a novel constitution in which to one substrate-type electronic element formed of an insulating base member and imparted with a function of a passive element, other one electronic element is joined.

In the composite electronic component having the novel constitution as described above, the upper surface of the insulating base member of the substrate-type electronic element faces the other one electronic element. The upper surface is provided with an upper surface conductor to which other one electronic element is connected via a joint material. In one mode of the composite electronic component having a novel constitution, on the upper surface of the insulating base member of the substrate-type electronic element, another upper surface conductor that is connected with an electric functional part contained in the substrate-type electronic element is also disposed in addition to the upper surface conductor.

These upper surface conductors generally contain a conductive layer formed of Ag or Cu so as to obtain sufficient conductivity. However, Ag and Cu are conductive materials that easily cause to a so-called "ion migration", the problem that under the application of an electric field, they partly ionize and migrate to other position, and after the migration, they are reduced and precipitated again.

For this reason, when such an upper surface conductor as in the composite electronic component having a novel constitution is used without taking any measures against the problem of ion migration, insulation resistance between the upper surface conductors can be deteriorated.

SUMMARY OF THE INVENTION

Preferred embodiments of the present invention provide a composite electronic component capable of preventing deterioration in insulation resistance between upper surface conductors in a substrate-type electronic component including joined multiple electronic components.

A composite electronic component according to a preferred embodiment of the present invention includes a first electronic element, a second electronic element mounted on the first electronic element in a height direction, and a joint material joining the first electronic element and the second electronic element. The first electronic element includes an insulating base member including an upper surface intersecting with the height direction, and an upper surface conductor disposed on the upper surface of the base member. The second electronic element includes an element body having a lower surface facing the upper surface of the base member in the height direction, and a terminal conductor disposed on at least a portion of the lower surface of the element body. The joint material joins at least a portion of the upper surface conductor and at least a portion of the terminal conductor. The upper surface conductor includes a conductive layer containing Ag or Cu as a metal component that is maximum in weight ratio, and at least a portion of the lateral surface of the conductive layer is covered with a protective metal film. The metal component that is maximum in weight ratio contained in the protective metal film is a metal other than Ag and Cu.

In a composite electronic component according to a preferred embodiment of the present invention, preferably, the metal component that is maximum in weight ratio contained in the protective metal film is any one of Sn, Ni, Au and Pb.

In a composite electronic component according to a preferred embodiment of the present invention, the protective metal film may be a covering conductive layer that covers the upper surface and the lateral surfaces of the conductive layer contained in the upper surface conductor.

In a composite electronic component according to a preferred embodiment of the present invention, the protective metal film may be a plating layer.

In a composite electronic component according to a preferred embodiment of the present invention, the protective metal film may be part of the joint material.

In a composite electronic component according to a preferred embodiment of the present invention, it is preferred that the upper surface conductor is smaller than the terminal conductor in any directions orthogonal to the height direction.

In a composite electronic component according to a preferred embodiment of the present invention, it is preferred that a thickness of the upper surface conductor is greater than or equal to about 5 μm.

In a composite electronic component according to a preferred embodiment of the present invention, the upper surface conductor may include a first upper surface conductor and a second upper surface conductor that are separated from each other in a length direction orthogonal to the height direction, and a third upper surface conductor located between the first upper surface conductor and the second upper surface conductor, and the terminal conductor may include a first terminal conductor and a second terminal conductor that are separated from each other in the length direction.

In that case, the first terminal conductor may be joined with the first upper surface conductor by the joint material, and the second terminal conductor may be joined with the second upper surface conductor by the joint material.

In a composite electronic component according to a preferred embodiment of the present invention, the first upper surface conductor may be located between each end of the first terminal conductor in a width direction orthogonal to the height direction and the length direction, and the second upper surface conductor may be located between each end of the second terminal conductor in the width direction. In that case, it is preferred that, of the lateral surfaces of the first upper surface conductor, the lateral surface orthogonal to the width direction is covered with the protective metal film, and of the lateral surfaces of the second upper surface conductor, the lateral surface orthogonal to the width direction is covered with the protective metal film.

In a composite electronic component according to a preferred embodiment of the present invention, the dimension in the width direction of the base member may be larger than the dimension in the width direction of the second electronic element.

In a composite electronic component according to a preferred embodiment of the present invention, the first upper surface conductor may be located between an outer end of the first terminal conductor and an outer end of the second terminal conductor in the length direction, and the second upper surface conductor may be located between the outer end of the first terminal conductor and the outer end of the second terminal conductor in the length direction. In that case, it is preferred that, of the lateral surfaces of the first upper surface conductor, the lateral surface orthogonal to the length direction is covered with the protective metal film, and of the lateral surfaces of the second upper surface conductor, the lateral surface orthogonal to the length direction is covered with the protective metal film.

In a composite electronic component according to a preferred embodiment of the present invention, the dimension in the length direction of the base member may be larger than the dimension in the length direction of the second electronic element.

In a composite electronic component according to a preferred embodiment of the present invention, the element body may include a plurality of dielectric layers and a plurality of conductive layers that are laminated, and in that case, the first electronic element may include a resistor that is disposed on the upper surface of the base member and connected with the third upper surface conductor.

In a composite electronic component according to a preferred embodiment of the present invention, the upper surface conductor may include a fourth upper surface conductor located between the first upper surface conductor and the second upper surface conductor, and in that case, the resistor may be connected with the fourth upper surface conductor.

In a composite electronic component according to a preferred embodiment of the present invention, the upper surface conductor may include a first upper surface conductor and a second upper surface conductor that are separated from each other in a length direction orthogonal to the height direction, and the terminal conductor may include a first terminal conductor and a second terminal conductor that are separated from each other in the length direction. In that case, the first terminal conductor may be joined with the first upper surface conductor by the joint material, and the second terminal conductor may be joined with the second upper surface conductor by the joint material. Also in that case, the first electronic element may further include a lower surface conductor disposed on the lower surface thereof opposite to the upper surface of the base member, and the lower surface conductor may include a first lower surface conductor and a second lower surface conductor that are separated from each other in the length direction, and a third lower surface conductor located between the first lower surface conductor and the second lower surface conductor. Additionally, in that case, the element body may include a plurality of dielectric layers and a plurality of conductive layers that are laminated, and the first electronic element may contain inductor wiring that is disposed inside the base member and is electrically connected with the third lower surface conductor.

In a composite electronic component according to a preferred embodiment of the present invention, the lower surface conductor may include a fourth lower surface conductor located between the first lower surface conductor and the second lower surface conductor, and in that case, wiring of an inductor may be electrically connected with the fourth lower surface conductor.

According to various preferred embodiments of the present invention, it is possible to provide a composite electronic component capable of preventing deterioration in insulation resistance between upper surface conductors in the substrate-type electronic component including a plurality of joined electronic components.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be specifically described by referring to attached drawings. It is to be noted that in the following preferred embodiments, the same or a common element is denoted by the same reference sign in different drawings and the description thereof will not be repeated.

Here, as part of this description, the entire contents of Japanese Patent Application No. 2015-049457 are incorporated by reference.

Preferred Embodiment 1

Figure 1:
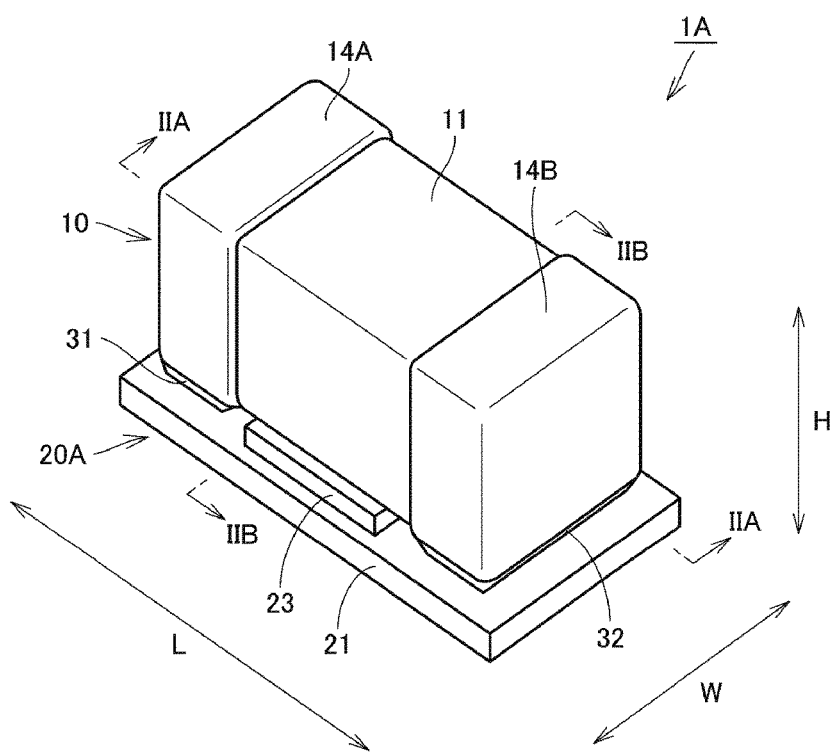
FIG. 1 is a schematic perspective view of a composite electronic component according to Preferred Embodiment 1 of the present invention.
Figure 2A:
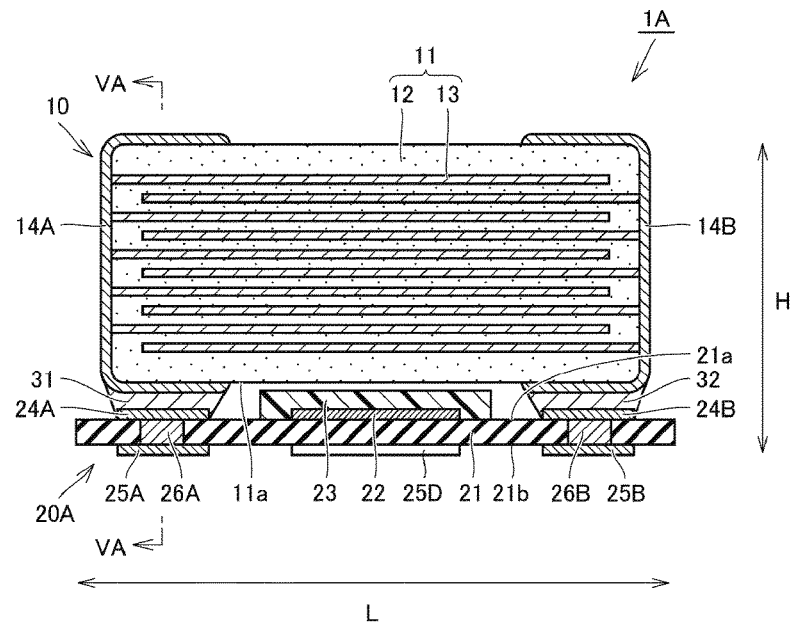
FIGS. 2A and 2B are schematic section views of a composite electronic component shown in FIG. 1.
Figure 2B:
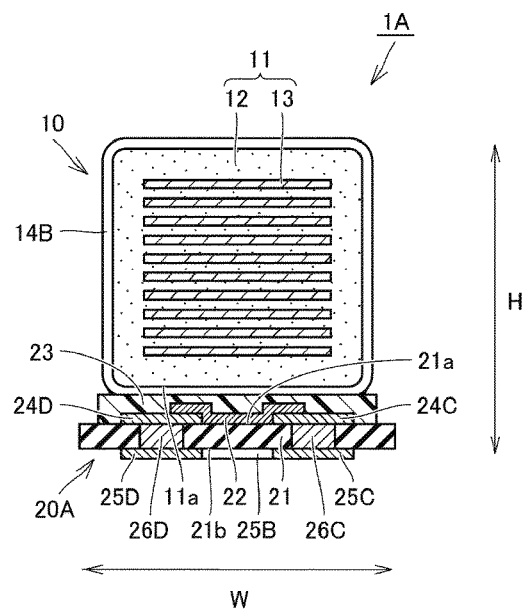
Figure 3A:
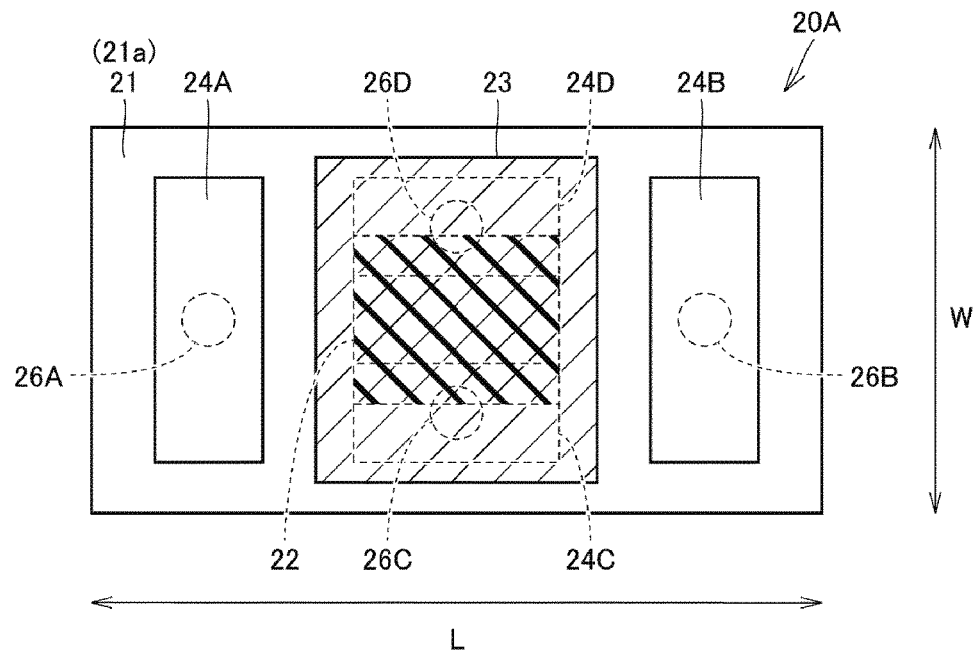
FIGS. 3A and 3B shows a schematic top view and a schematic bottom view of the resistance element shown in FIG. 1.
Figure 3B:
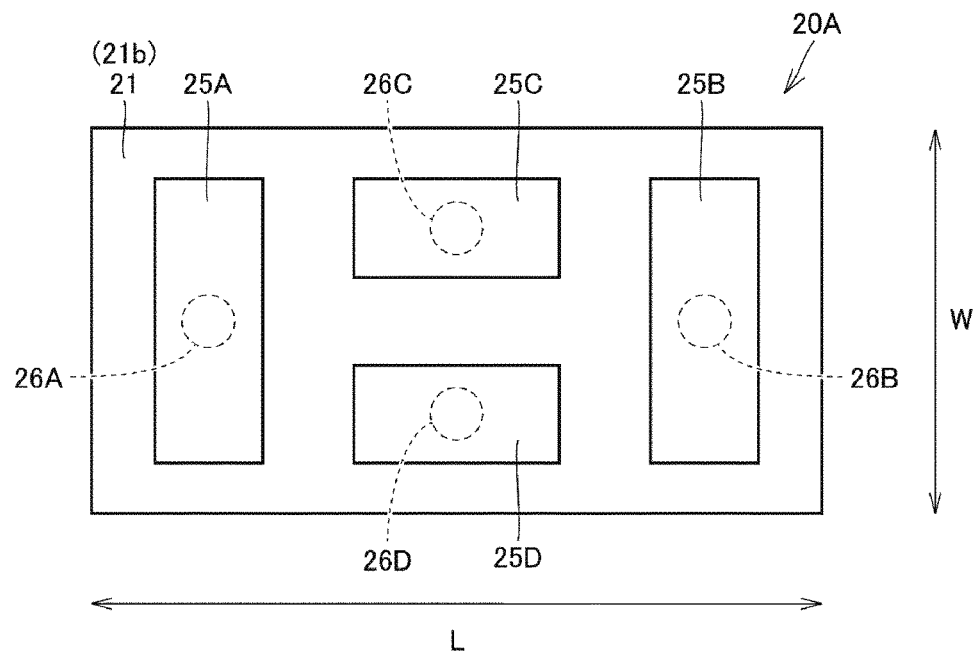
Figure 4:
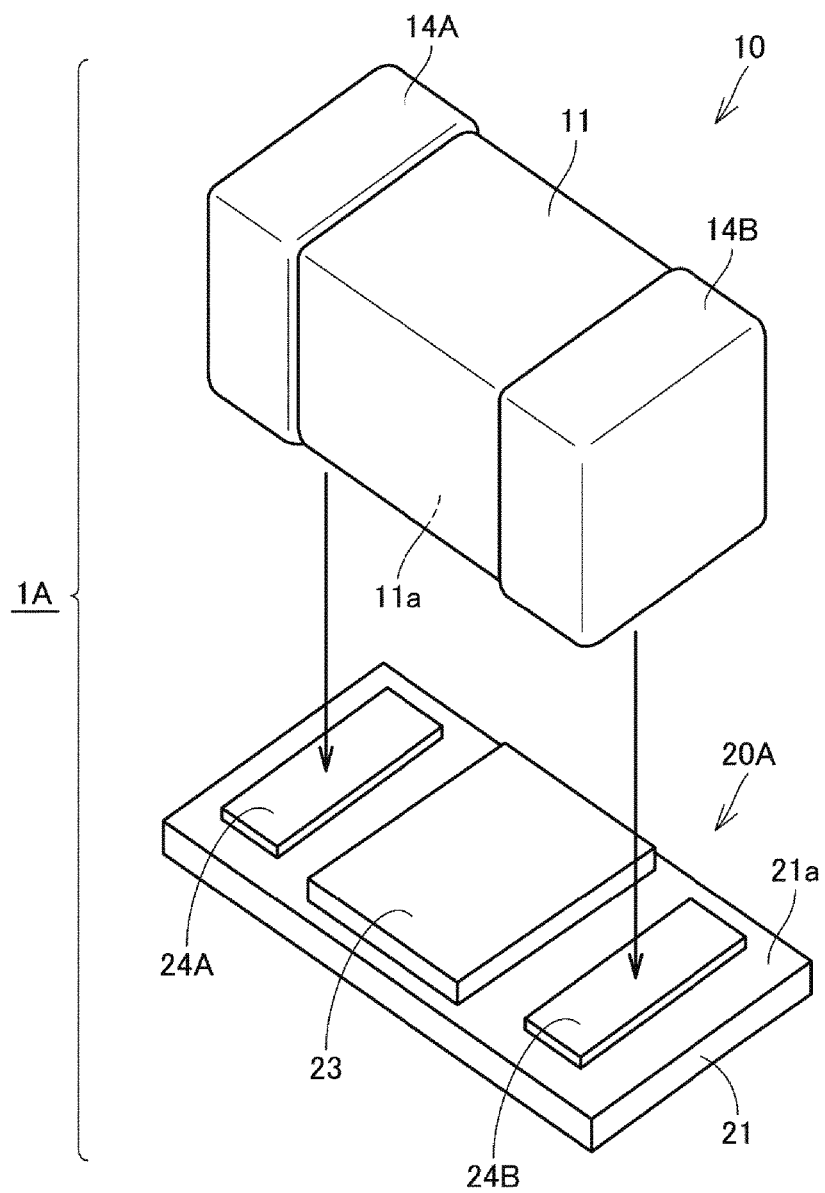
FIG. 4 is a schematic perspective view in which the composite electronic component shown in FIG. 1 is exploded.
Figure 5A:
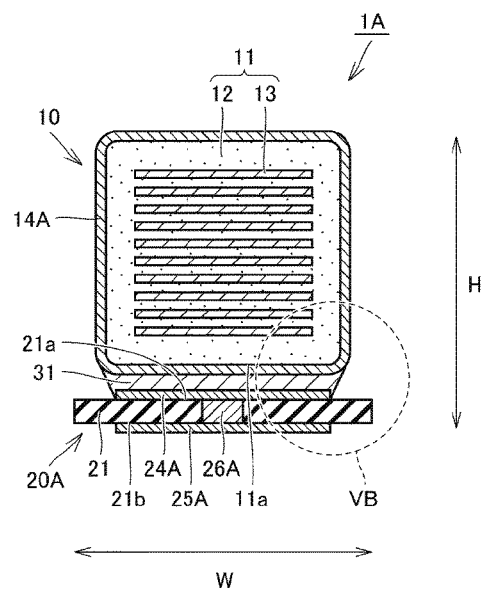
FIGS. 5A and 5B are schematic section views of the composite electronic component shown in FIG. 1 and an enlarged schematic section view of a portion thereof.
Figure 5B:
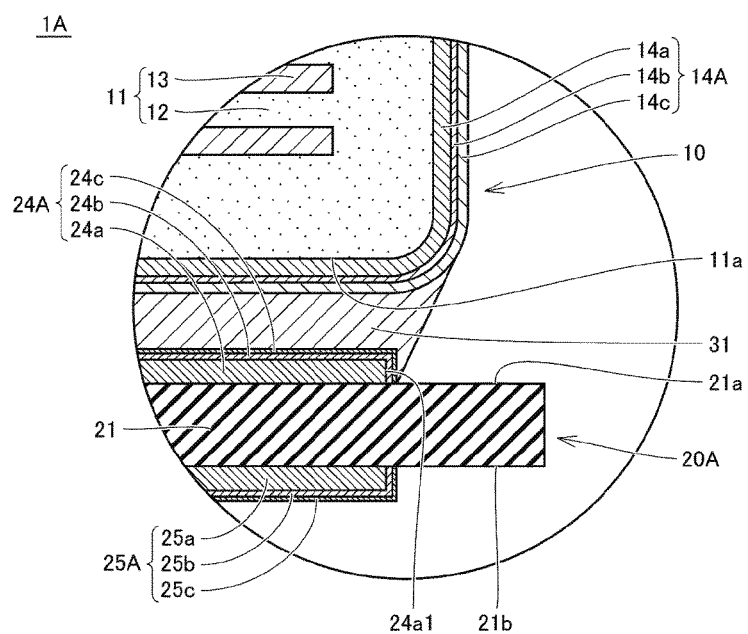

FIG. 1 is a schematic perspective view of a composite electronic component 1A according to preferred embodiment 1 of the present invention. FIG. 2A and FIG. 2B are schematic section views when the composite electronic component 1A according to the present preferred embodiment is cut along the line IIA-IIA and the line IIB-IIB shown in FIG. 1. FIG. 3A and FIG. 3B are a schematic top view and a schematic bottom view of a resistance element 20A shown in FIG. 1. FIG. 4 is an exploded schematic perspective view of the composite electronic component 1A according to the present preferred embodiment shown in FIG. 1. FIG. 5A is a schematic section view when the composite electronic component 1A according to the present preferred embodiment is cut along the line VA-VA shown in FIGS. 2A and 2B. FIG. 5B is an enlarged schematic section view of a region VB shown in FIG. 5A. Referring to FIG. 1 to FIG. 5B, a composite electronic component 1A according to the present preferred embodiment will be described.

As illustrated in FIG. 1, FIGS. 2A and 2B, FIG. 4 and FIGS. 5A and 5B, the composite electronic component 1A according to the present preferred embodiment includes two electronic elements. To be more specific, the composite electronic component 1A includes the resistance element 20A as a first electronic element, and a capacitor element 10 as a second electronic element. The capacitor element 10 is an electronic component containing a capacitor element C. The resistance element 20A is an electronic component containing a resistance element (R).

The capacitor element 10 has a substantially rectangular parallelepiped shape, and the dimension of the four sides along the later-described length direction L is larger than the dimension of the four sides along the later-described width direction W. The substantially rectangular parallelepiped shape used herein includes those in which corner portions and ridge portions of the capacitor element 10 are rounded, and those in which a step or unevenness is provided on the surface of the capacitor element 10.

The resistance element 20A has a substantially plate shape having a predetermined thickness, in which the dimension of the four sides along the later-described length direction L is larger than the dimension of four sides along the later-described width direction W. The substantially plate shape used herein includes those in which corner portions and ridge portions of the resistance element 20A are rounded, and those in which a step or unevenness is provided on the surface of the resistance element 20A.

As illustrated in FIG. 1, FIGS. 2A and 2B, and FIGS. 5A and 5B, the capacitor element 10 is disposed on the resistance element 20A. To be more specific, each electronic element is arranged so that a lower surface 11a of the capacitor element 10 and an upper surface 21a of the resistance element 20 face each other. The capacitor element 10 is joined with the resistance element 20A via first and second joint materials 31, 32.

Here, for specifically describing the composite electronic component 1A, the direction in which the capacitor element 10 and the resistance element 20A align is called a height direction H. Of the directions orthogonal to the height direction H, the direction in which a first and a second external electrodes 14A, 14B of the later-described capacitor element 10 align is called a length direction L. The direction orthogonal to both of the height direction H and the length direction L is called a width direction W.

As illustrated in FIG. 1, FIGS. 2A and 2B, FIG. 4 and FIGS. 5A and 5B, the capacitor element 10 is, for example, a multilayer ceramic capacitor, and includes a capacitor body 11 as an element body, and the first and second external electrodes 14A, 14B as a terminal conductor. In this description, the first and second external electrodes 14A, 14B are also called first and second terminal conductors. The capacitor body 11 has a substantially rectangular parallelepiped shape, and the first and second external electrodes 14A, 14B disposed in a predetermined region on its surface are separated from each other in the length direction L, for example, by a distance of about 300 μm.

As illustrated in FIGS. 2A and 2B, and FIGS. 5A and 5B, the capacitor body 11 includes a plurality of dielectric layers 12 and a plurality of internal electrode layers 13, and each of the dielectric layers 12 and each of the internal electrode layers 13 are laminated alternately to define the capacitor body 11. In the composite electronic component 1A according to the present preferred embodiment, the direction of laminating the plurality of dielectric layers 12 and the plurality of internal electrode layers 13 coincides with the height direction H. However, this is merely illustrative, and the direction of laminating the plurality of dielectric layers 12 and the plurality of internal electrode layers 13 may coincide with the width direction W.

The dielectric layers 12 are formed of a ceramic material containing barium titanate ($BaTiO_3$), calcium titanate ($CaTiO_3$), strontium titanate ($SrTiO_3$), potassium zirconate ($CaZrO_3$) or the like as a main component. The dielectric layers 12 may contain Mn, Mg, Si, Co, Ni, rare earth metal or the like as a secondary component which is smaller in the amount than the main component. On the other hand, the internal electrode layers 13 are formed of a material including a metal material such as Ni, Cu, Ag, Pd, Ag—Pd alloy, or Au.

As illustrated in FIG. 5B, each of the first and second external electrodes 14A, 14B includes a plurality of conductive layers including an underlying conductive layer 14a, a covering conductive layer 14b, and a covering conductive layer 14c that is different from the covering conductive layer 14b. In FIG. 5B, only the first external electrode 14A is illustrated. The underlying conductive layer 14a is formed of a sintered metal layer that is formed, for example, by baking a paste of Cu, Ni, Ag, Pd, Ag—Pd alloy, Au or the like. For example, the covering conductive layer 14b is a Ni layer as a plating layer, and the covering conductive layer 14c is a Sn layer as a plating layer covering the covering conductive layer 14b. The covering conductive layers 14b, 14c may be a Cu layer or an Au layer as a plating layer in place of the same.

In the present preferred embodiment, the underlying conductive layer 14a is formed of a Cu layer as a sintered metal layer, the covering conductive layer 14b is formed of a Ni layer as a plating layer, and the covering conductive layer 14c is formed of a Sn layer as a plating layer. The covering conductive layer 14b which is a Ni layer as a plating layer is covered with the covering conductive layer 14c which is a Sn layer as a plating layer.

The first and second external electrodes 14A, 14B may be formed only of the plating layer while the underlying conductive layer 14a is omitted. The underlying conductive layer 14a may be formed of a conductive resin layer obtained by curing a conductive resin paste containing a metal component and a resin component.

As illustrated in FIG. 1, FIGS. 2A and 2B, and FIGS. 5A and 5B, the capacitor body 11 includes a pair of end surfaces that are opposite to each other in the length direction L, a pair of lateral surfaces that are opposite to each other in the width direction W, and a pair of principal surfaces that are opposite to each other in the height direction H. Among these, the lower surface 11a which is one of the pair of principal surfaces that are opposite to each other in the height direction H faces the resistance element 20A.

The first external electrode 14A connects to one end surface of the capacitor body 11, and a portion of each of the pair of lateral surfaces and the pair of principal surface, and the second external electrode 14B connects to the other end surface of the capacitor body 11 and a portion of each of the pair of lateral surfaces and the pair of principal surfaces. As a result, a predetermined region of the lower surface 11a of the capacitor body 11 is covered with the first and second external electrodes 14A, 14B that are separated from each other in the length direction L, and between the first and second external electrodes 14A, 14B, a portion of the lower surface 11a of the capacitor body 11 is exposed.

As illustrated in FIGS. 2A and 2B, one of the pair of internal electrode layers 13 neighboring with one dielectric layer 12 interposed therebetween along the height direction H is drawn out to one of the pair of end surfaces of the capacitor body 11 and electrically connected to one of the first and second external electrodes 14A, 14B. Then the other of the internal electrode layers 13 is drawn out to the other of the pair of end surfaces of the capacitor body 11, and is electrically connected to the other of the first and second external electrodes 14A, 14B. As a result, between the first and second external electrodes 14A, 14B, a plurality of capacitors are connected electrically in parallel.

The capacitor element 10 is produced, for example, in the following manner. A ceramic green sheet which is to be the dielectric layer 12, and a material sheet on which a conductive paste which is to be the internal electrode layer 13 are laminated alternately in such a manner that the latter is stacked on the surface of the former, and then they are pressure bonded to obtain a multilayer chip.

Here, a multilayer block in which a plurality of multilayer chips are integrated may be preliminarily prepared, and the multilayer block may be detached to obtain a multilayer chip. Next, by firing the multilayer chip, the capacitor body 11 is obtained. Thereafter, on the surface of the capacitor body 11, the first and second external electrodes 14A, 14B are formed, and thus the capacitor element 10 is produced.

The size of the capacitor element 10 is not particularly limited, and as one non-limiting example, the dimension thereof in the length direction L is about 0.62 mm, the dimension thereof in the width direction W is about 0.32 mm, and the dimension thereof in the height direction H is about 0.32 mm.

As illustrated in FIG. 1 to FIG. 5B, the resistance element 20A includes an insulating base member 21, a resistor 22, a protective film 23, a first to a fourth upper surface conductors 24A-24D, a first to a fourth lower surface conductors 25A-25D, and a first to a fourth connecting conductors 26A-26D. When the first to fourth connecting conductors 26A-26D are provided as via conductors inside the base member 21, these may also be called a first to a fourth via conductors 26A-26D.

The base member 21 has a substantially plate shape having a predetermined thickness, and is formed, for example, of a resin material such as epoxy resin, a ceramic material such as alumina, or materials in which a filler or woven fabric formed of an inorganic material or an organic material is added to the resin material or the ceramic material. More preferably, an alumina substrate, or a ceramic substrate including a low temperature co-fired ceramic (LTCC) substrate is used as the base member 21. In the present preferred embodiment, a LTCC substrate is used as the base member 21.

The base member 21 includes a first and a second lateral surfaces which are a pair of lateral surfaces opposite to each other in the length direction L, a third and a fourth lateral surfaces which are a pair of lateral surfaces opposite to each other in the width direction W, and a pair of principal surfaces opposite to each other in the height direction H. As illustrated in FIGS. 2A and 2B, FIG. 4 and FIGS. 5A and 5B, the upper surface 21a which is one of the pair of principal surfaces faces the capacitor element 10, and the lower surface 21b which is the other of the pair of principal surfaces faces the wiring substrate (not illustrated) on which the composite electronic component 1A is mounted. To prevent the second electronic element and another electronic component mounted beside on the wiring substrate from coming into contact with each other, it is preferred that the size in the length direction L of the base member 21 is larger than the dimension in the length direction L of the second electronic element, and the dimension in the width direction W of the base member 21 is larger than the dimension of the width direction L in the second electronic element.

As illustrated in FIGS. 2A and 2B and FIG. 3, the resistor 22 is disposed at a predetermined position on the upper surface 21a of the base member 21, and has a rectangular or circular film shape in plan view along the height direction H. As the resistor 22, for example, a metal film, a metal oxide film, a metal glaze film which is a mixture of a metal oxide film and glass, and the like can be used.

The protective film 23 covers at least a portion of the resistor 22 on the upper surface 21a of the base member 21, and is formed of an insulating film of, for example, a glass material, a resin material or the like. Here, it is preferred that the protective film 23 completely covers the resistor 22 so that the resistor 22 will not be exposed.

The first and second upper surface conductors 24A, 24B are disposed on the upper surface 21a of the base member 21 and are formed of a rectangular conductive film. The dimension in the length direction L of the first and second upper surface conductors 24A, 24B is, for example, about 0.125 mm. The first and second upper surface conductors 24A, 24B are separated from each other in the length direction L, for example, by a distance of about 0.36 mm, and are disposed near each end part in the length direction L of the upper surface 21a of the base member 21. The first upper surface conductor 24A is separated from the first lateral surface, the third lateral surface and the fourth lateral surface by a predetermined interval, for example, by a distance of about 0.025 mm. The second upper surface conductor 24B is separated from the second lateral surface, the third lateral surface and the fourth lateral surface by a predetermined interval, for example, by a distance of about 0.025 mm. The first and second upper surface conductors 24A, 24B of the base member 21 include an Ag layer in which the metal component that is maximum in weight ratio among contained metal components is Ag, and a Cu layer in which the metal component that is maximum in weight ratio among contained metal components is Cu.

The third and fourth upper surface conductors 24C, 24D are disposed on the upper surface 21a of the base member 21, and are formed of a rectangular conductive film. The third and fourth upper surface conductors 24C, 24D are located between the region where the first upper surface conductor 24A is disposed and the region where the second upper surface conductor 24B is disposed in the length direction L. Also, the third and fourth upper surface conductors 24C, 24D are separated from each other in the width direction W, and are disposed near each end part in the width direction W of the upper surface 21a of the base member 21. Here, the third and fourth upper surface conductors 24C, 24D may also be separated from each other and disposed in the length direction L.

The third and fourth upper surface conductors 24C, 24D include an Ag layer in which the metal component that is maximum in weight ratio among contained metal components is Ag, and a Cu layer in which the metal component that is maximum in weight ratio among contained metal components is Cu.

The first and second lower surface conductors 25A, 25B are disposed on the lower surface 21b of the base member 21, and are formed of a rectangular conductive film. The first and second lower surface conductors 25A, 25B are separated from each other in the length direction L, and are disposed near each end portion in the length direction L of the lower surface 21b of the base member 21. The first lower surface conductor 25A is opposite to the first upper surface conductor 24A with the base member 21 interposed therebetween, and is separated from the first lateral surface, the third lateral surface, and the fourth lateral surface by a predetermined interval. Also, the second lower surface conductor 25B is opposite to the second upper surface conductor 24B with the base member 21 interposed therebetween, and is separated from the second lateral surface, the third lateral surface, and the fourth lateral surface by a predetermined interval.

The third and fourth lower surface conductors 25C, 25D are disposed on the lower surface 21b of the base member 21, and are formed of a rectangular conductive film. The third and fourth lower surface conductors 25C, 25D is located between the region where the first lower surface conductor 25A is disposed, and the region where the second lower surface conductor 25B is disposed in the length direction L. Also, the third and fourth lower surface conductors 25C, 25D are separated from each other in the width direction W, and are disposed near each end portion in the width direction W of the lower surface 21b of the base member 21.

The first and second connecting conductors 26A, 26B are the first and second via conductors 26A, 26B that penetrate the base member 21 along the height direction H, and have a substantially circular shape in plan view along the height direction H. The first via conductor 26A overlaps the first upper surface conductor 24A and the first lower surface conductor 25A in plan view along the height direction H, and connects the first upper surface conductor 24A and the first lower surface conductor 25A. The second via conductor 26B overlaps the second upper surface conductor 24B and the second lower surface conductor 25B in plan view along the height direction H, and connects the second upper surface conductor 24B and the second lower surface conductor 25B.

The third and fourth connecting conductors 26C, 26D are the third and fourth via conductors 26C, 26D that penetrate the base member 21 along the height direction H, and have a substantially circular shape in plan view along the height direction H. The third via conductor 26C overlaps the third upper surface conductor 24C and the third lower surface conductor 25C in plan view along the height direction H, and connects the third upper surface conductor 24C and the third lower surface conductor 25C. The fourth via conductor 26D overlaps the fourth upper surface conductor 24D and the fourth lower surface conductor 25D in plan view along the height direction H, and connects the fourth upper surface conductor 24D and the fourth lower surface conductor 25D.

The first to fourth connecting conductors 26A-26D may be disposed on the lateral surface of the base member 21.

The resistor 22 is located between the region where the first upper surface conductor 24A is disposed and the region where the second upper surface conductor 24B is disposed in the length direction L, and in plan view from the height direction H, one end of the resistor 22 in the width direction W overlaps a portion of the third upper surface conductor 24C, and the other end overlaps a portion of the fourth upper surface conductor 24D. As a result, the third and fourth upper surface conductors 24C, 24D are connected with the resistor 22.

In order to prevent physical interference between the resistance element 20A and the capacitor element 10, preferably, the dimension in the length direction L of the resistor 22 is set to be smaller than the interval between the first external electrode 14A and the second external electrode 14B of the capacitor element 10.

Also, to prevent the contact with other conductive member, it is preferred that the protective film 23 covers not only the resistor 22 but also the third and fourth upper surface conductors 24C, 24D.

While the size of the resistance element 20A is not particularly limited, as one example, the dimension thereof in the length direction L is about 0.66 mm, the dimension thereof in the width direction W is about 0.36 mm and the dimension thereof in the height direction H is about 0.14 mm.

The resistance element 20A may lack the fourth upper surface conductor 24D and have only the first to third upper surface conductors 24A-24C on the upper surface of the base member. In this case, the resistor 22 is connected with the first upper surface conductor 24A or the second upper surface conductor 24B in place of the fourth upper surface conductor 24D. Also in this case, the resistance element 20A may lack the fourth lower surface conductor 25D and the fourth via conductor 26D.

As illustrated in FIG. 5B, each of the first and second upper surface conductors 24A, 24B includes a plurality of conductive layers including an underlying conductive layer 24a, a covering conductive layer 24b and a covering conductive layer 24c. In FIG. 5B, only the first upper surface conductor 24A is shown. Here, the underlying conductive layer 24a is formed of an Ag layer as a sintered metal layer formed by baking an Ag paste, and the covering conductive layers 24b, 24c are formed of a Ni layer as a plating layer and an Au layer as a plating layer that covers the same, respectively.

On the other hand, it is preferred that the third and fourth upper surface conductors 24C, 24D are formed simultaneously with the underlying conductive layers 24a of the first and second upper surface conductors 24A, 24B from the view point of facilitating the production. In that case, the third and fourth upper surface conductors 24C, 24D are preferably formed of an Ag layer as a sintered metal layer formed by baking an Ag paste.

It is also preferred that the first to fourth lower surface conductors 25A-25D are formed in the same manner as that for the first and second upper surface conductors 24A, 24B from the view point of facilitating the production. In that case, as illustrated in FIG. 5B, the first to fourth lower surface conductors 25A-25D include a plurality of conductive layers including an underlying conductive layer 25a which is an Ag layer as a sintered metal layer formed by baking an Ag paste, and a covering conductive layer 25b which is a Ni layer as a plating layer, and a covering conductive layer 25c which is an Au layer as a plating layer covering the same. In FIG. 5B, only the first lower surface conductor 25A is illustrated.

Further, from the view point of facilitating the production, it is preferred that the first to fourth via conductors 26A-26D are formed in the same manner as that for the underlying conductive layers 24a of the first and second upper surface conductors 24A, 24B, and the third and fourth upper surface conductors 24C, 24D or the underlying conductive layer 25a of the first to fourth lower surface conductors 25A-25D. That is, it is preferred that the first to fourth via conductors 26A-26D are formed of a sintered metal layer formed by baking an Ag paste.

Here, the reason of containing an Ag layer as a sintered metal layer in any of the first to fourth upper surface conductors 24A-24D, and the first to fourth lower surface conductors 25A-25D is to obtain sufficient conductivity in the upper surface conductor and the lower surface conductor. Also the reason of configuring any of the outermost portions of the first and second upper surface conductors 24A, 24B and the first to fourth lower surface conductors 25A-25D by an Au layer as a covering conductive layer is to sufficiently obtain the electrical and the mechanical connection reliability between the upper surface conductor and the lower surface conductor, and the joint material joined therewith.

As illustrated in FIG. 1, FIGS. 2A and 2B, and FIGS. 5A and 5B, the capacitor element 10 and the resistance element 20A are joined via the first and second joint materials 31, 32. To be more specific, since the capacitor element 10 is arranged and mounted on the side of the upper surface 21a of the resistance element 20A in the height direction H, and thus the lower surface 11a of the capacitor body 11 and the upper surface 21a of the base member 21 face each other in the height direction H. The first external electrode 14A of the capacitor element 10 and the first upper surface conductor 24A of the resistance element 20A are joined via the first joint material 31, and the second external electrode 14B and the second upper surface conductor 24B are joined via the second joint material 32.

As the first and second joint materials 31, 32, for example, solder, a conductive adhesive or the like can be used, and solder is particularly preferred. As general solder, solder containing Sn in a metal weight ratio of about 96.5%, Ag in a metal weight ratio of about 3%, and Cu in a metal weight ratio of about 0.5% (Sn-3Ag-0.5Cu ternary system solder) preferably is used. Further, in mounting the composite electronic component 1A on the wiring substrate, it is preferred to use so-called high temperature solder as the first and second joint materials 31, 32 to prevent the solder that joins the capacitor element 10 and the resistance element 20A from re-melting. As the high-temperature solder, for example, solders based on Sn as a main metal component to which Bi, Au, Zn, Al or Sb is added are known.

Thus, the first external electrode 14A is electrically connected with the first lower surface conductor 25A through the first upper surface conductor 24A and the first via conductor 26A. The second external electrode 14B is electrically connected with the second lower surface conductor 25B through the second upper surface conductor 24B and the second via conductor 26B. Therefore, the first and second upper surface conductors 24A, 25B and the first and second via conductors 26A, 26B define and function as a relay conductor of the capacitor element 10. The first and second lower surface conductors 25A, 25B define and function as a connection terminal to the wiring substrate of the capacitor element 10.

Meanwhile, the resistor 22 provided in the resistance element 20A is electrically connected with the third and fourth upper surface conductors 24C, 24D of the resistance element 20A as described above. The third upper surface conductor 24C is electrically connected with the third lower surface conductor 25C through the third via conductor 26C. The fourth upper surface conductor 24D is electrically connected with the fourth lower surface conductor 25D through the fourth via conductor 26D. Therefore, the third and fourth upper surface conductors 24C, 24D and the third and fourth via conductors 26C, 26D define and function as a relay conductor of the resistor 22. The third and fourth lower surface conductors 25C, 25D define and function as a connection terminal to the wiring substrate of the resistance element 20A.

Here, as illustrated in FIG. 5B, in the composite electronic component 1A according to the present preferred embodiment, each of the first and second upper surface conductors 24A, 24B includes a plurality of layers including an Ag layer as the underlying conductive layer 24a, a Ni layer as the covering conductive layer 24b, and an Au layer as the covering conductive layer 24c as described above. Regarding the Ag layer as the underlying conductive layer 24a, the upper surface thereof is covered with the covering conductive layers 24b, 24c, and additionally the lateral surfaces thereof (these lateral surfaces include a pair of lateral surfaces intersecting the length direction L and a pair of lateral surfaces intersecting the width direction W) are covered with the covering conductive layers 24b, 24c. FIG. 5B shows the state that one lateral surface 24a1 of the pair of lateral surfaces intersecting the width direction W in the underlying conductive layer 24a of the first upper surface conductor 24A is covered with the covering conductive layers 24b, 24c.

In the composite electronic component 1A according to the present preferred embodiment, since the lateral surfaces of the underlying conductive layer 24a formed of an Ag layer are covered with the covering conductive layers 24b, 24c as the protective metal film not containing Ag and Cu, the underlying conductive layer 24a formed of the Ag layer will not be exposed outside. Therefore, it is possible to reduce the occurrence of the problem of ion migration caused by the Ag layer contained in the first and second upper surface conductors 24A, 24, and deterioration in insulation resistance between upper surface conductors is prevented. Therefore, the composite electronic component 1A according to the present preferred embodiment has high reliability.

In the composite electronic component 1A according to the present preferred embodiment, unlike the first and second upper surface conductors 24A, 24B, the third and fourth upper surface conductors 24C, 24D are formed exclusively of the underlying conductive layer 24a formed of an Ag layer. This is because the third and fourth upper surface conductors 24C, 24D are covered with the protective film 23 that covers the resistor 22 in place of the covering conductive layer, and occurrence of ion migration is able to be reduced by being covered with the protective film 23. However, when the whole or part of each of the third and fourth upper surface conductors 24C, 24D is not covered with the protective film 23, it is preferred that the Ag layers of the third and fourth upper surface conductors 24C, 24D are covered with the covering conductive layers 24b, 24c as is the case with the first and second upper surface conductors 24A, 24B.

Also in the composite electronic component 1A according to the present preferred embodiment, the covering conductive layers 24b, 24c that cover the lateral surfaces of the underlying conductive layer 24a formed of an Ag layer in each of the first and second upper surface conductors 24A, 24B are further covered with the first and second joint materials 31, 32. Here, since the first and second joint materials 31, 32 are formed of Sn-3Ag-0.5Cu ternary system solder as described above, Ag and Cu which are conductive materials that easily cause ion migration are contained. However, the amounts of Ag and Cu contained in the first and second joint materials 31, 32 are very small, and thus the degree of ion migration that can occur is much lower in comparison with the case where the underlying conductive layer 24a formed of an Ag layer is exposed. Therefore, with such a structure, it is possible to ensure the high reliability.

Here, when the covering conductive layers 24b, 24c that cover the lateral surfaces of the underlying conductive layer 24a formed of an Ag layer in each of the first and second upper surface conductors 24A, 24B are further covered with the first and second joint materials 31, 32, a so-called self-alignment effect is easily obtained in mounting of the capacitor element 10 on the resistance element 20A. The details will be described later.

In the composite electronic component 1A according to the present preferred embodiment, the first and second upper surface conductors 24A, 24B is used also in the first to fourth lower surface conductors 25A-25D. With such a structure, it is possible to prevent the deterioration in insulation resistance between these lower surface conductors.

Figure 6:
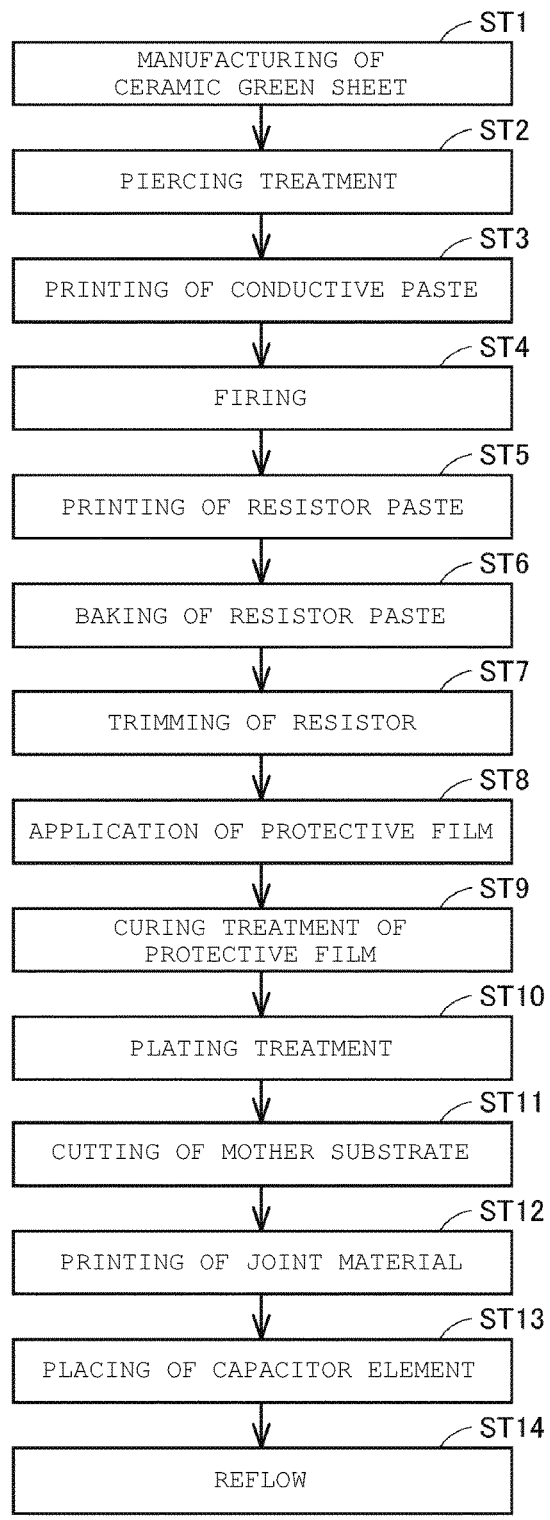
FIG. 6 is a flowchart for illustrating the production process of the composite electronic component shown in FIG. 1.
Figure 9:
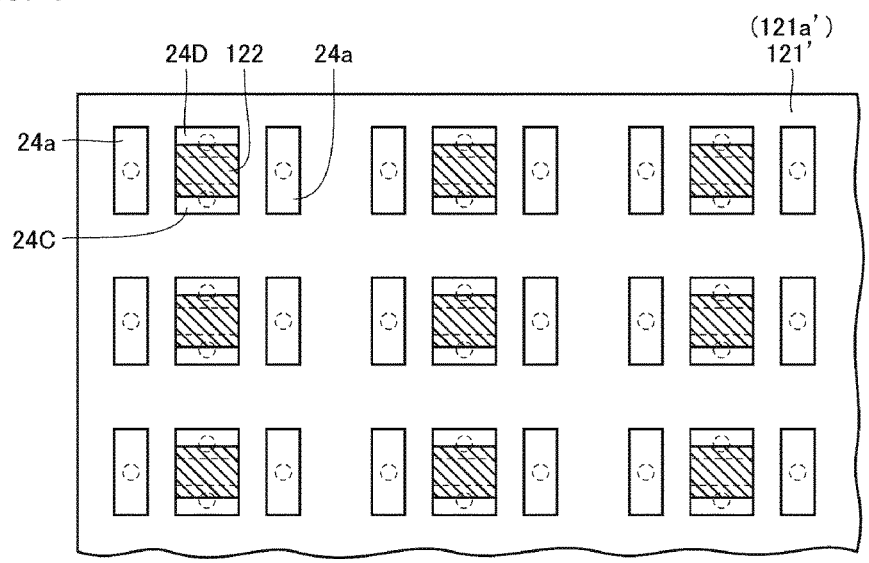
FIG. 9 is a schematic plan view for illustrating the step of printing a resistor paste shown in FIG. 6.
Figure 10:
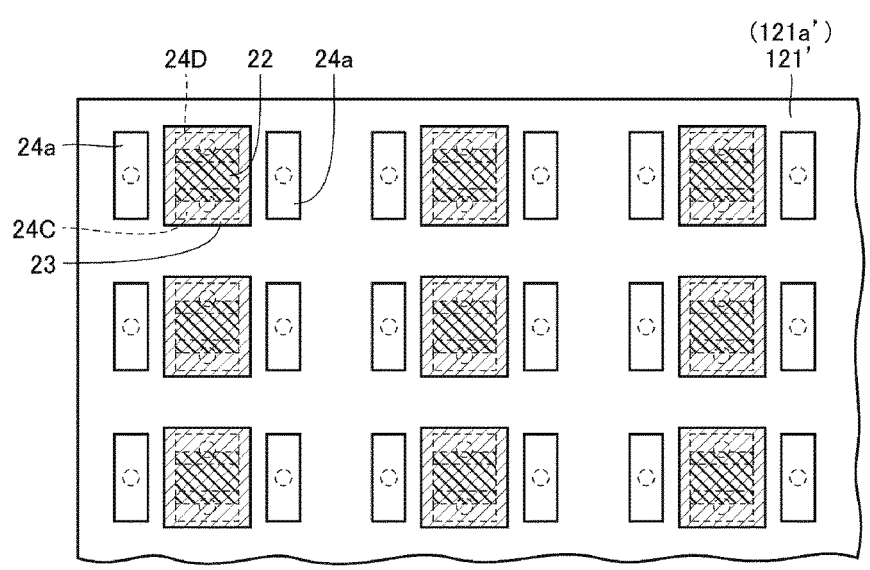
FIG. 10 is a schematic plan view for illustrating the step of applying a protective film shown in FIG. 6.
Figure 11:
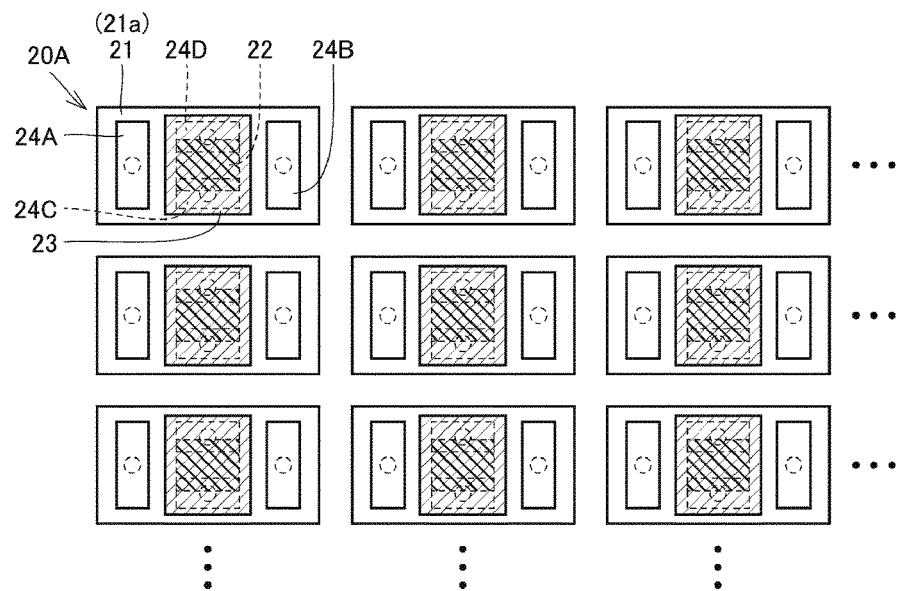
FIG. 11 is a schematic plan view for illustrating the step of cutting a mother substrate shown in FIG. 6.
Figure 12:
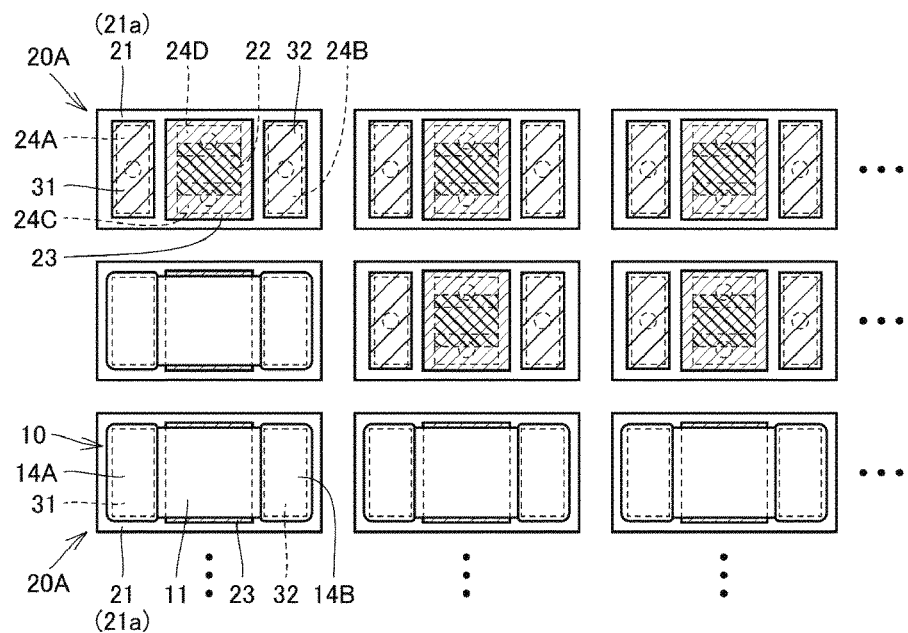
FIG. 12 is a schematic plan view for illustrating the step of printing a joint material and the step of placing a capacitor element shown in FIG. 6.
Figure 13A:
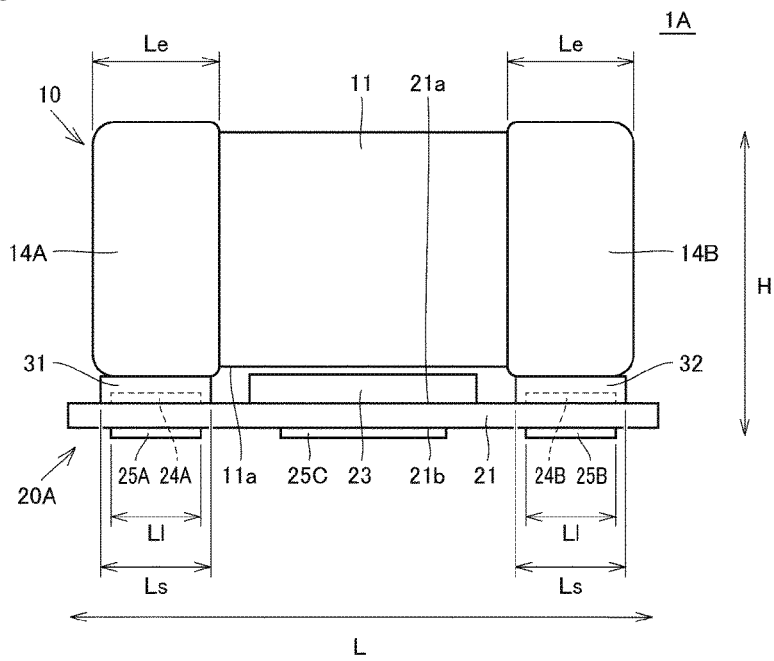
FIGS. 13A and 13B are schematic side views for illustrating the step of printing a joint material and the step of placing a capacitor element shown in FIG. 6.
Figure 13B:
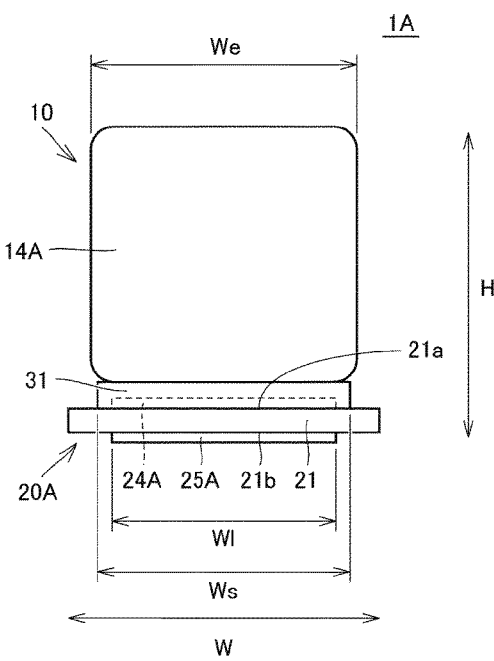

FIG. 6 is a flowchart for illustrating a production process of the composite electronic component 1A shown in FIG. 1, and FIG. 7 to FIG. 13B are schematic plan views and schematic lateral views for illustrating individual steps in the flowchart shown in FIG. 6. Hereinafter, referring to FIG. 6 to FIG. 13B, a production process of the composite electronic component 1A according to the present preferred embodiment will be described. FIG. 7 to FIG. 10 are schematic views of the good in process in the production process viewed from the side of an upper surface 121a of a ceramic green sheet 121, and FIG. 11 and FIG. 12 are schematic views of the good in process in the production process viewed from the side of the upper surface 21a of the base member 21 of the resistance element 20A. Also, FIG. 13A is a schematic view of the good in process in the production process viewed along the width direction W, and FIG. 13B is a schematic view of the good in process in the production process viewed along the length direction L.

Among the production steps described below, the step of manufacturing the resistance element 20A is for the case where an assembly in which multiple resistance elements 20A are integrated is preliminarily prepared, and the assembly is disassembled to manufacture the plurality of resistance elements 20A collectively. The manufacturing flow of the resistance element 20A is not limited to this. The assembly corresponds to a mother substrate 121' as shown in FIG. 10 or the like.

As illustrated in FIG. 6, first of all, a ceramic green sheet is manufactured (Step ST1). Specifically, by mixing a ceramic powder, a binder resin and a solvent or the like in a predetermined mixing ratio, a ceramic slurry is prepared. The ceramic slurry is applied in a sheet form on the carrier film by dye coating, gravure coating, microgravure coating, screen printing, spray coating or the like, and thus a ceramic green sheet is formed. The formed ceramic green sheet is to become the mother substrate 121' which is an assembly of the resistance elements 20A, and also to become the base member 21 of the resistance element 20A.

Figure 7:
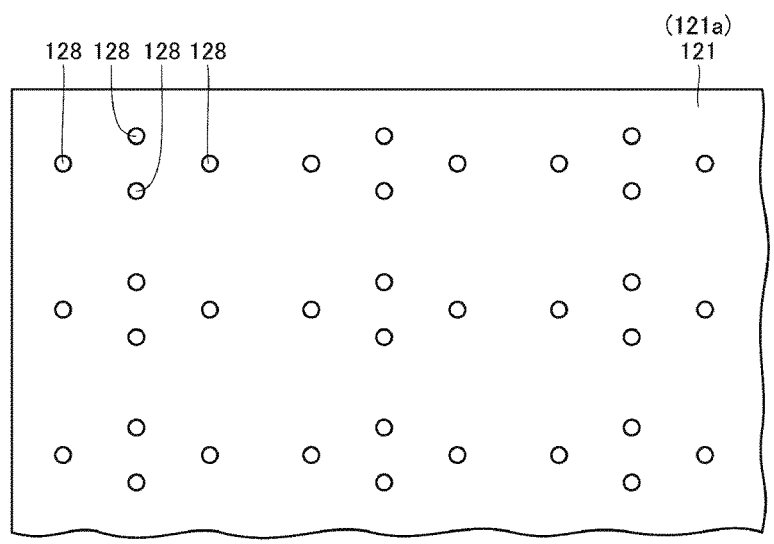
FIG. 7 is a schematic plan view for illustrating the piercing step shown in FIG. 6.

Next, a piercing is conducted (Step ST2). Specifically, as illustrated in FIG. 7, a plurality of through holes 128 are formed in the ceramic green sheet 121. Formation of the through holes 128 is a pretreatment for forming the first to fourth via conductors 26A-26D.

Figure 8:
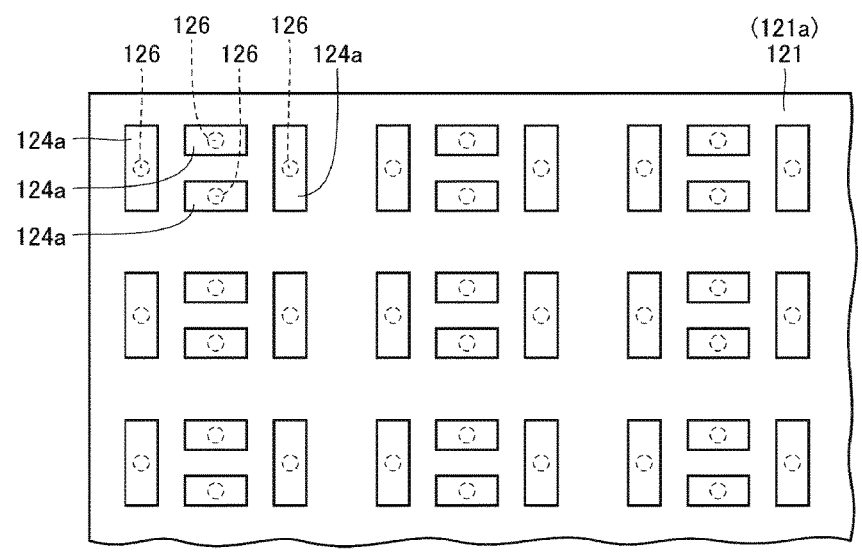
FIG. 8 is a schematic plan view for illustrating the step of printing a conductive paste shown in FIG. 6.

Returning to FIG. 6, next, a conductive paste is printed (Step ST3). Specifically, as illustrated in FIG. 8, on the upper surface 121a and the lower surface of the ceramic green sheet 121, an Ag paste is printed as a conductive paste by a screen printing method, a gravure printing method or the like. As a result, the through holes 128 provided in the ceramic green sheet 121 are buried by a conductive pattern 126 formed of an Ag paste which is to become the first to fourth via conductors 26A-26D, and the upper surface 121a of the ceramic green sheet 121 is formed with a conductive pattern 124a of a predetermined shape formed of an Ag paste which is to become the first to fourth upper surface conductors 24A-24D, and further the lower surface of the ceramic green sheet 121 is formed with a conductive pattern of a predetermined shape formed of an Ag paste which is to become the first to fourth lower surface conductors 25A-25D.

Returning to FIG. 6, next, firing is conducted (Step ST4). Specifically, the good in process up to then is heated to a predetermined temperature, and thus a sintering treatment for the ceramic green sheet 121 and the conductive patterns 124a, 126 and the like formed of an Ag paste printed on the ceramic green sheet 121 is conducted. As a result, the ceramic green sheet 121 turns into the hard mother substrate 121', and the conductive patterns 124a, 126 and the like turn into sintered metal layers. As a result, as illustrated in FIG. 9 or the like, the mother substrate 121' is formed with the underlying conductive layers 24a, 25a which are to become part of the first and second upper surface conductors 24A, 24B and the first to fourth lower surface conductors 25A-25D, and the third and fourth upper surface conductors 24C, 24D, and the first to fourth via conductors 26A-26D.

Returning to FIG. 6, next, a resistor paste is printed (Step ST5). Specifically, as illustrated in FIG. 9, on the upper surface 121a' of the mother substrate 121', a resistor paste is printed by using a screen printing method, a gravure printing method or the like. As a result, on the upper surface 121a' of the mother substrate 121', a resistor pattern 122 formed of the resistor paste is formed. At that time, printing is conducted in such a manner that the resistor pattern 122 overlaps a portion of the third and fourth upper surface conductors 24C, 24D.

Returning to FIG. 6, next, the resistor paste is baked (Step ST6). Specifically, the good in process up to then is heated to a predetermined temperature, and thus a sintering treatment for the resistor paste printed on the mother substrate 121' is conducted as illustrated in FIG. 10. As a result, the resistor pattern 122 is baked to the mother substrate 121', and thus the resistor 22 is formed on the mother substrate 121'.

Returning to FIG. 6, trimming of the resistor is conducted (Step ST7). Specifically, the resistor 22 is irradiated with laser light to remove a portion thereof, and thus the resistance of the resistor 22 is adjusted.

Next, a protective film is applied (Step ST8), and then a curing treatment of the protective film is conducted (Step ST9). Specifically, as illustrated in FIG. 10, the protective film 23 is applied in such a manner that it covers the resistor 22 and the third and fourth upper surface conductors 24C, 24D connected with the resistor 22. Thereafter, the good in process up to then is heated to a predetermined temperature, and thus the protective film 23 is cured in the condition that it adheres to the mother substrate 121'.

Returning to FIG. 6, next, a plating treatment is conducted (Step ST10). Specifically, by dipping the good in process up to then in a Ni plating bath and an Au plating bath sequentially, a plating treatment of the underlying conductive layers 24a, 25a exposed on the mother substrate 121' is conducted. As a result, the underlying conductive layers 24a, 25a are covered with the covering conductive layers 24b, 25b which are Ni layers, and the covering conductive layers 24b, 25b are covered with the covering conductive layers 24c, 25c which are Au layers. As a result, the first and second upper surface conductors 24A, 24B and the first to fourth lower surface conductors 25A-25D are formed. At that time, also the lateral surfaces of the underlying conductive layer 24a are covered with the covering conductive layers 24b, 24c which are a Ni layer and an Au layer.

Next, the mother substrate 121' is cut (Step ST11). Specifically, as illustrated in FIG. 11, the mother substrate 121' is cut along a predetermined cutting line by press-cutting or dicing, and thus individual resistance elements 20A are cut out. In this manner, the manufacturing of the resistance element 20A is completed.

Then returning to FIG. 6, a joint material is printed (Step ST12), and then a capacitor element is placed (Step ST13). Specifically, as illustrated in FIG. 12 and FIGS. 13A and 13B, the first and second joint materials 31, 32 formed of a solder paste are printed by a screen printing method or the like in such a manner that they cover the first and second upper surface conductors 24A, 24B, respectively, and the capacitor element 10 is placed so that the first and second external electrodes 14A, 14B are disposed on the first and second joint materials 31, 32, respectively.

Here, as illustrated in FIG. 13A, letting the dimension of each of the first and second external electrodes 14A, 14B in the length direction be Le, and the dimension of each of the first and second upper surface conductors 24A, 24B in the length direction L be Ll, it is preferred that Le and Ll satisfy the relationship Ll<Le. That is, in the length direction L, the first and second upper surface conductors 24A, 24B are preferably located between the outer end of the first external electrode 14A and the outer end of the second external electrode 14B. That is, preferably, the distance between the outer end of the first upper surface conductor 24A and the outer end of the second external electrode 14B is smaller than the distance between the outer end of the first external electrode 14A and the outer end of the second external electrode 14B, and also preferably, the distance between the outer end of the second upper surface conductor 24B and the outer end of the first external electrode 14A is smaller than the distance between the outer end of the second external electrode 14B and the outer end of the first external electrode 14A. Also the outer end of the length direction L of the first upper surface conductor 24A in plan view from the height direction H preferably overlaps the first external electrode 14A, and the outer end of the length direction L of the second upper surface conductor 24B preferably overlaps the second external electrode 14B.

The outer end of the first external electrode 14A in the length direction L is the end farther from the second external electrode 14B, of the ends in the length direction L of the first external electrode 14A. The outer end of the second external electrode 14B in the length direction L is the end farther from the first external electrode 14A, of the ends in the length direction L of the second external electrode 14B. The outer end of the first upper surface conductor 24A in the length direction L is the end farther from the second upper surface conductor 24B, of the ends in the length direction L of the first upper surface conductor 24A. The outer end of the second upper surface conductor 24B in the length direction L is the end farther from the first upper surface conductor 24B, of the ends in the length direction L of the second upper surface conductor 24B.

Also as illustrated in FIG. 13B, letting the dimension of each of the first and second external electrodes 14A, 14B in the width direction W be We, and the dimension of each of the first and second upper surface conductors 24A, 24B in the width direction W be Wl, it is preferred that We and Wl satisfy the relationship Wl<We. That is, in the width direction W, the first upper surface conductor 24A is preferably located between each end of the first external electrode 14A, and the second upper surface conductor 24B is preferably located between each end of the second external electrode 14B. That is, in the width direction, the distance Wl between one end and the other end of the first upper surface conductor 24A is preferably smaller than the distance between one end of the first external electrode 14A and the other end of the first upper surface conductor 24A, and the distance We between one end and the other end of the second upper surface conductor 24B is preferably smaller than the distance between one end of the second external electrode 14B and the other end of the second upper surface conductor 24B. Also, preferably, each end in the width direction W of the first upper surface conductor 24A in plan view from the height direction H overlaps the first external electrode 14A, and each end in the width direction W of the second upper surface conductor 24B overlaps the second external electrode 14B.

That is, it is preferred that the size of the first and second upper surface conductors 24A, 24B is smaller than the size of the first and second external electrodes 14A, 14B in any directions orthogonal to the height direction H (hereinafter, the preferred feature is referred to as "Feature 1"). In the present preferred embodiment, the whole of the first upper surface conductor 24A overlaps the first external electrode 14A, and the whole of the second upper surface conductor 24B overlaps the second external electrode 14B in plan view from the height direction H.

On the other hand, as illustrated in FIG. 13A, letting the length of each of the regions where the first and second joint materials 31, 32 are applied in the length direction L be Ls, it is preferred that the Ls and Ll satisfy the relationship of Ll<Ls. Also as illustrated in FIG. 13B, letting the length of each of the regions where the first and second joint materials 31, 32 are applied in the width direction W be Ws, it is preferred that the Ws and Wl satisfy the relationship of Wl<Ws.

That is, it is preferred that the first and second joint materials 31, 32 are applied in such a manner that they lie off the first and second upper surface conductors 24A, 24B, respectively (hereinafter, the preferred feature is referred to as "Feature 2").

By satisfying Feature 1 and/or Feature 2, it becomes easier to obtain a so-called self-alignment effect at the time of reflow, namely in mounting the capacitor element 10 on the resistance element 20A. The self-alignment effect used herein refers to such an effect that when the solder melted for soldering receives a force of reducing the surface area (namely surface tension), the electronic element which is to be mounted supported by the melted solder moves and thus positioning thereof is achieved. This self-alignment effect makes it possible to prevent the positional deviation at the time of mounting.

Here, by satisfying Feature 1, the lateral surfaces of the first and second upper surface conductors 24A, 24B are located on the inner side than the capacitor element 10 in plan view. And at the time of melting of the solder as the first and second joint materials 31, 32, the surface tension of the solder positioned near the lateral surfaces of the first and second upper surface conductors 24A, 24B acts in the direction of pulling the capacitor element 10 situated thereabove inwardly. The force of pulling the capacitor element 10 inwardly is very large in comparison with the case where there is no solder near the lateral surfaces of the first and second upper surface conductors 24A, 24B. Therefore, by further satisfying Feature 2, the solder is situated near the lateral surfaces of the first and second upper surface conductors 24A, 24B, and thus greater force of pulling the capacitor element 10 inwardly is obtained, and hence the self-alignment effect is obtained more securely.

Since the self-alignment effect can be obtained more securely when the thickness of the first and second upper surface conductors 24A, 24B, namely, the height of the first and second upper surface conductors 24A, 24B on the basis of the upper surface 21a of the base member 21 of the resistance element 20A is greater than or equal to about 5 μm, the thickness of the first and second upper surface conductors 24A, 24B is preferably greater than or equal to about 5 μm.

Referring to FIG. 6, next, a reflow is conducted (Step ST14). Specifically, soldering is conducted by putting the good in process up to then into a reflow oven or the like, and the first and second upper surface conductors 24A, 24B and the first and second external electrodes 14A, 14B are joined by the first and second joint materials 31, 32, respectively. As a result, the capacitor element 10 is mounted on the resistance element 20A, and thus production of the composite electronic component 1A according to the present preferred embodiment is completed.

The production flow of the composite electronic component described in the above is merely illustrative, and naturally the composite electronic component 1A according to the present preferred embodiment can be produced according to other production flow.

Preferred Embodiment 2

Figure 14:
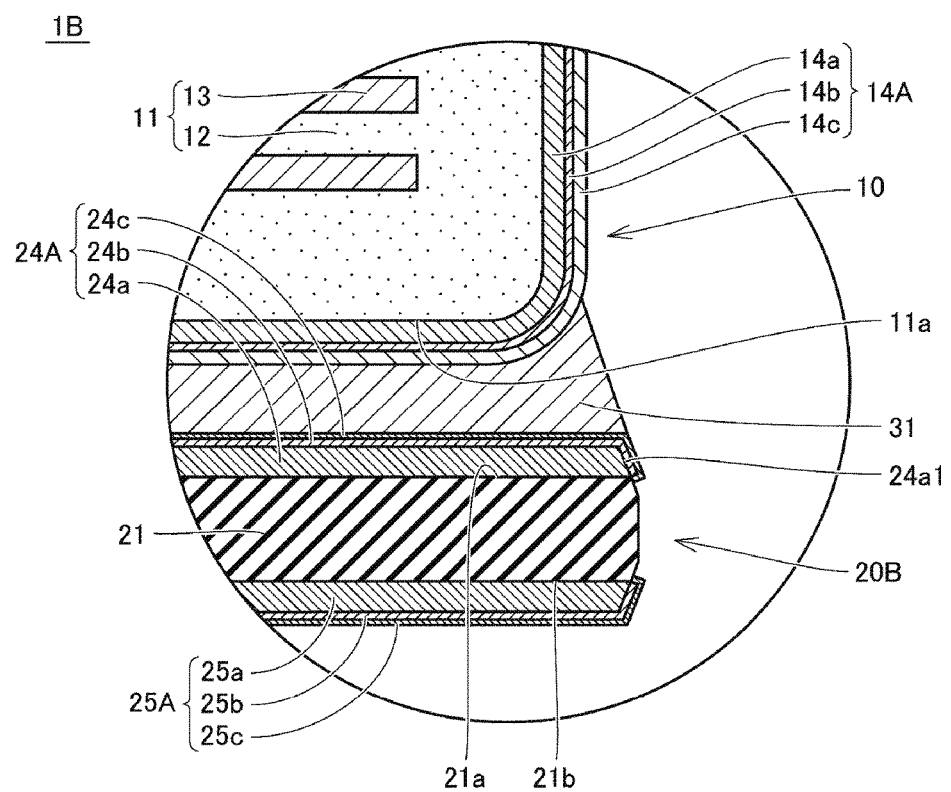
FIG. 14 is an enlarged schematic section view of a portion of a composite electronic component according to Preferred Embodiment 2 of the present invention.

FIG. 14 is an enlarged schematic section view of a portion of a composite electronic component 1B according to Preferred Embodiment 2 of the present invention, and FIG. 15A to FIG. 15D are schematic section views for illustrating individual steps in a manufacturing flow of a resistance element 20B shown in FIG. 14. Hereinafter, referring to FIG. 14 and FIGS. 15A-15D, a composite electronic component 1B according to the present preferred embodiment, and a manufacturing flow of the resistance element 20B provided in the composite electronic component 1B will be described.

As illustrated in FIG. 14, the composite electronic component 1B includes the resistance element 20B different from that of the resistance element 20A of composite electronic component 1A according to Preferred Embodiment 1. The joining positions of the first and second joint materials 31, 32 with respect to the first and second upper surface conductors 24A, 24B provided in the resistance element 20B are different from those in the composite electronic component 1A.

Specifically, the first and second upper surface conductors 24A, 24B include a plurality of conductive layers including the underlying conductive layer 24a which is an Ag layer, the covering conductive layer 24b which is a Ni layer, and the covering conductive layer 24c which is an Au layer covering the same. Regarding the underlying conductive layer 24a which is an Ag layer, not only the upper surface thereof is covered with the covering conductive layers 24b, 24c but also the lateral surface 24a1 thereof is covered with the covering conductive layers 24b, 24c. In FIG. 14, only the first upper surface conductor 24A is shown.

Meanwhile, in each of the first and second upper surface conductors 24A, 24B, the covering conductive layers 24b, 24c that cover the lateral surface 24a1 of the underlying conductive layer 24a which is an Ag layer are not covered with the first and second joint materials 31, 32, and only the covering conductive layers 24b, 24c that cover the upper surface of the underlying conductive layer 24a are covered with the first and second joint materials 31, 32. FIG. 14 shows the state that the lateral surface 24a1 of the underlying conductive layer 24a of the first upper surface conductor 24A is covered only with the covering conductive layers 24b, 24c.

Also with such a structure, since the lateral surface 24a1 of the underlying conductive layer 24a which is an Ag layer is covered with the covering conductive layers 24b, 24c as a protective metal film not containing Ag and Cu, likewise the case of Preferred Embodiment 1, it is possible to prevent the deterioration in insulation resistance between upper surface conductors.

In the composite electronic component 1B according to the present preferred embodiment, unlike the case of Preferred Embodiment 1, the size of the first and second upper surface conductors 24A, 24B is larger than the first and second external electrodes 14A, 14B in the direction orthogonal to the height direction H. With such a structure, the degree of obtaining the self-alignment effect deteriorates more or less, comparable effects with Preferred Embodiment 1 are able to be obtained in the point of effectively preventing deterioration in insulation resistance between upper surface conductors.

The resistance element 20B is able to be easily manufactured, for example, according to the following manufacturing flow. Description of the manufacturing flow of the resistance element 20B basically follows the description of the manufacturing flow of the resistance element 20A, and the following description especially focuses on differences therebetween.

Figure 15A:
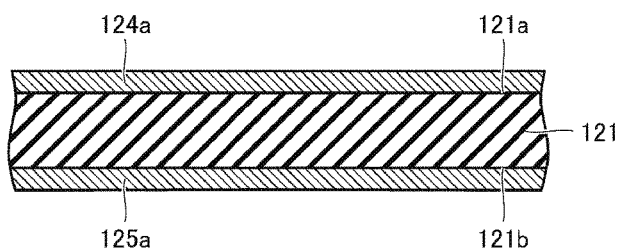
FIGS. 15A-15D are schematic section views for illustrating specific steps in the manufacturing flow of the resistance element shown in FIG. 14.

As illustrated in FIG. 15A, after printing conductive patterns 124a, 125a formed of an Ag paste having predetermined shapes are printed respectively on the upper surface 121a and the lower surface 121b of the ceramic green sheet 121, the good in process is fired. Thereafter, printing and baking of the resistor paste, trimming, application of a protective film and a curing treatment are sequentially conducted.

Figure 15B:
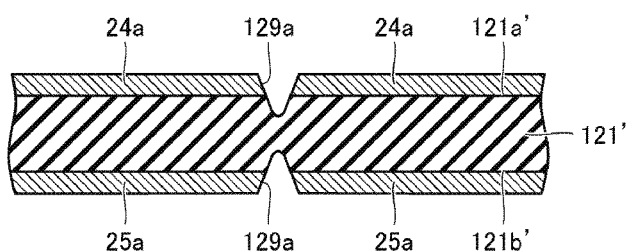

Next, as illustrated in FIG. 15B, laser light is emitted toward a predetermined position of the mother substrate 121' on which the underlying conductive layers 24a, 25a are formed from the upper surface 121a' side and the lower surface 121b' side to reach the mother substrate 121'. As a result, a groove 129a having a substantially v-shaped section is formed on each of the upper surface 121a' side and the lower surface 121b' side of the mother substrate 121', and the underlying conductive layers 24a, 25a are divided by the groove 129a.

Figure 15C:
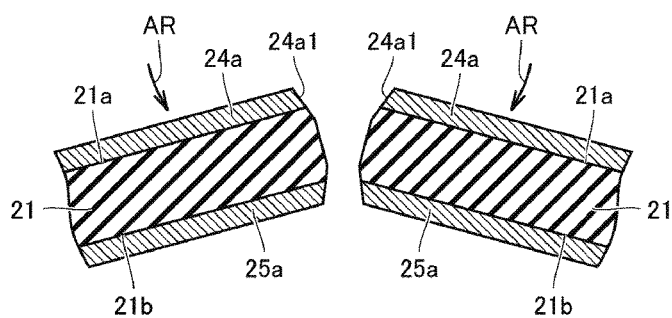

Next, as illustrated in FIG. 15C, the mother substrate 121' is cut by applying a force along the direction of the arrow AR shown in the drawing on the mother substrate 121' formed with the groove 129a. As a result, the mother substrate 121' is separated into separate pieces.

Figure 15D:
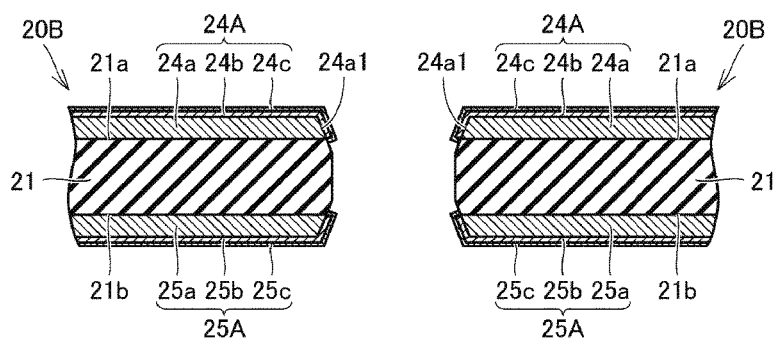

Next, as illustrated in FIG. 15D, the cut out individual goods in process are subjected to a plating treatment, and the covering conductive layer 24b which is a Ni layer as a plating layer, and the covering conductive layer 24c which is an Au layer as a plating layer are formed to cover the underlying conductive layer 24a, and the covering conductive layer 25b which is a Ni layer as a plating layer and the covering conductive layer 25c which is an Au layer as a plating layer are formed to cover the underlying conductive layer 25a. As a result, the first and second upper surface conductors 24A, 24B in which the lateral surface 24a1 of the underlying conductive layer 24a is covered with the covering conductive layers 24b, 24c are formed. In this manner, manufacturing of the resistance element 20B is completed.

Also, by forming a plating layer on the underlying conductive layers 24a, 24b after forming the groove 129a in the mother substrate 121' and before cutting the mother substrate 121' into separate pieces, it is possible to obtain the resistance element 20B of the same structure.

Preferred Embodiment 3

Figure 16:
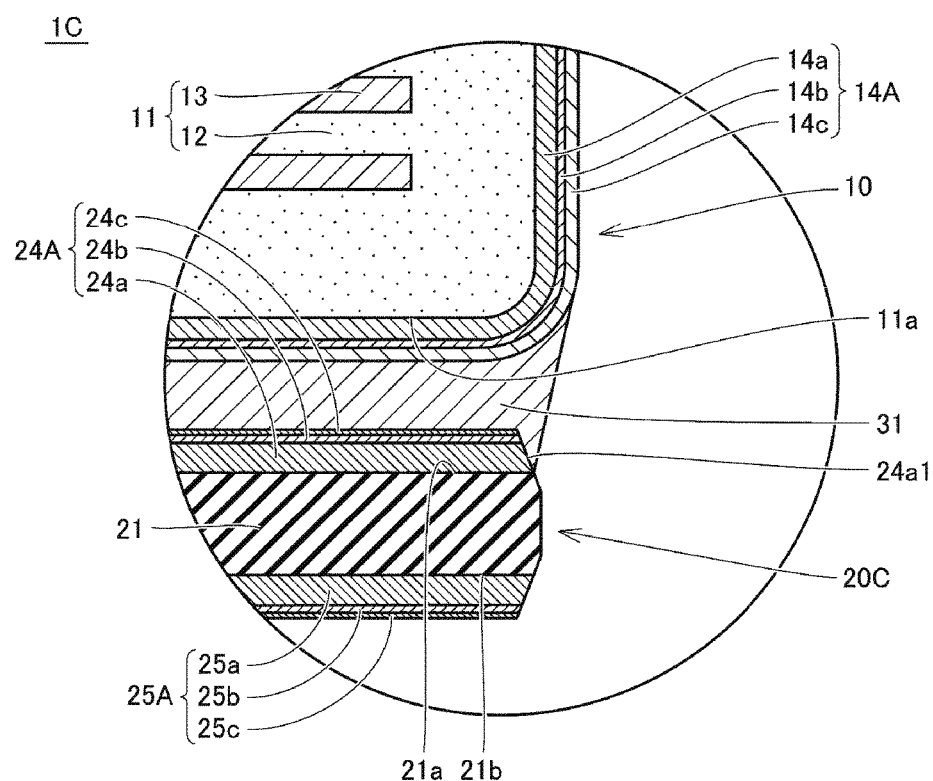
FIG. 16 is an enlarged schematic section view of a portion of a composite electronic component according to Preferred Embodiment 3 of the present invention.

FIG. 16 is an enlarged schematic section view of a portion of a composite electronic component 1C according to Preferred Embodiment 3 of the present invention, and FIG. 17A to FIG. 17D are schematic section views for illustrating individual steps in a manufacturing flow of a resistance element 20C shown in FIG. 16. Hereinafter, referring to FIG. 16 and FIGS. 17A-17D, a composite electronic component 10 according to the present preferred embodiment, and a manufacturing flow of the resistance element 20C provided in the composite electronic component 10 will be described.

As illustrated in FIG. 16, the composite electronic component 10 includes the resistance element 20C different from that of the resistance element 20A of composite electronic component 1A according to Preferred Embodiment 1.

Specifically, the first and second upper surface conductors 24A, 24B include a plurality of conductive layers including the underlying conductive layer 24a which is an Ag layer, the covering conductive layer 24b which is a Ni layer, and the covering conductive layer 24c which is an Au layer covering the same. Regarding the underlying conductive layer 24a which is an Ag layer, only the upper surface thereof is covered with the covering conductive layers 24b, 24c, and the lateral surface 24a1 thereof is not covered with the covering conductive layers 24b, 24c. In FIG. 16, only the first upper surface conductor 24A is shown.

Meanwhile, in each of the first and second upper surface conductors 24A, 24B, the lateral surface 24a1 of the underlying conductive layer 24a which is an Ag layer is covered with the first and second joint materials 31, 32. FIG. 16 shows the state that the lateral surface 24a1 of the underlying conductive layer 24a of the first upper surface conductor 24A is covered with the first joint material 31. The lateral surface 24a1 of the underlying conductive layer 24a overlaps the first external electrode 14A in view from the height direction H, and is inclined with respect to the height direction H. Therefore, the lateral surface 24a1 of the underlying conductive layer 24a of the first and second upper surface conductors 24A, 24B is easily covered with the first and second joint materials 31, 32, respectively.

While the size of the resistance element 20A is not particularly limited, as one example, the dimension thereof in the length direction L is about 0.66 mm, the dimension thereof in the width direction W is about 0.36 mm and the dimension thereof in the height direction H is about 0.14 mm.

Also with such a structure, since the lateral surface 24a1 of the underlying conductive layer 24a of the first and second upper surface conductors 24A, 24B is covered with the first and second joint materials 31, 32 as a protective metal film little containing Ag and Cu, respectively, it is possible to prevent the deterioration in insulation resistance between upper surface conductors likewise the case of Preferred Embodiment 1.

The resistance element 20C is easily manufactured, for example, according to the following manufacturing flow. Description of the manufacturing flow of the resistance element 20C basically follows the description of the manufacturing flow of the resistance element 20A, and the following description especially focuses on differences therebetween.

As illustrated in FIG. 15A, after printing conductive patterns 124a, 125a formed of an Ag paste having predetermined shapes are printed respectively on the upper surface 121a and the lower surface 121b of the ceramic green sheet 121, the good in process is fired. Thereafter, printing and baking of the resistor paste, trimming, application of a protective film and a curing treatment are sequentially conducted.

Figure 17A:
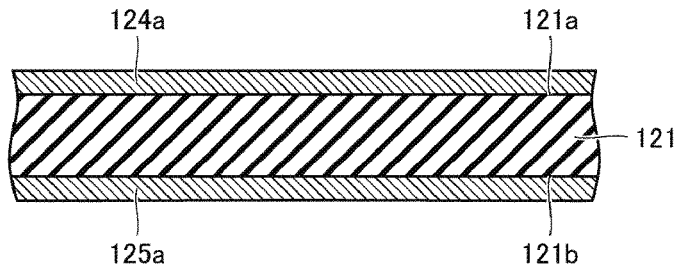
FIGS. 17A-17D are schematic section views for illustrating specific steps in the manufacturing flow of the resistance element shown in FIG. 16.
Figure 17B:
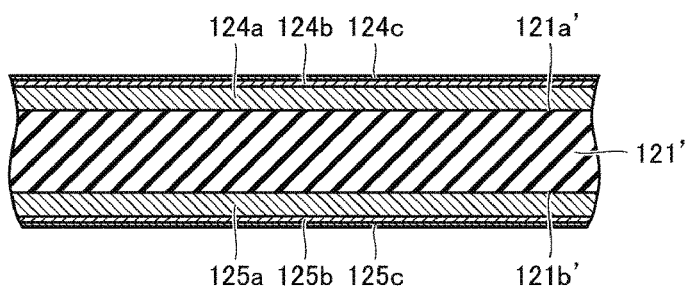

Next, as illustrated in FIG. 17B, the good in process up to then is subjected to a plating treatment, and the covering conductive layer 24b which is a Ni layer as a plating layer, and the covering conductive layer 24c which is an Au layer as a plating layer are formed to cover the underlying conductive layer 24a, and the covering conductive layer 25b which is a Ni layer as a plating layer and the covering conductive layer 25c which is an Au layer as a plating layer are formed to cover the underlying conductive layer 25a.

Figure 17C:
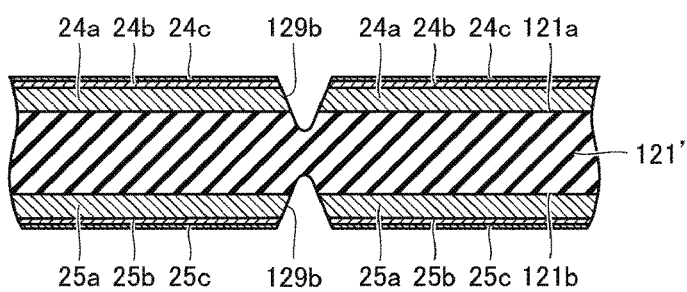

Next, as illustrated in FIG. 17C, laser light is emitted toward a predetermined position of the mother substrate 121' on which the underlying conductive layers 24a, 25a and the covering conductive layers 24b, 24c, 25b, 25c are formed from the upper surface 121a' side and the lower surface 121b' side to reach the mother substrate 121'. As a result, a groove 129b having a substantially v-shaped section is formed on each of the upper surface 121a' side and the lower surface 121b' side of the mother substrate 121', and the underlying conductive layers 24a, 25a, and the covering conductive layers 24b, 24c, 25b, 25c are divided by the groove 129b.

Figure 17D:
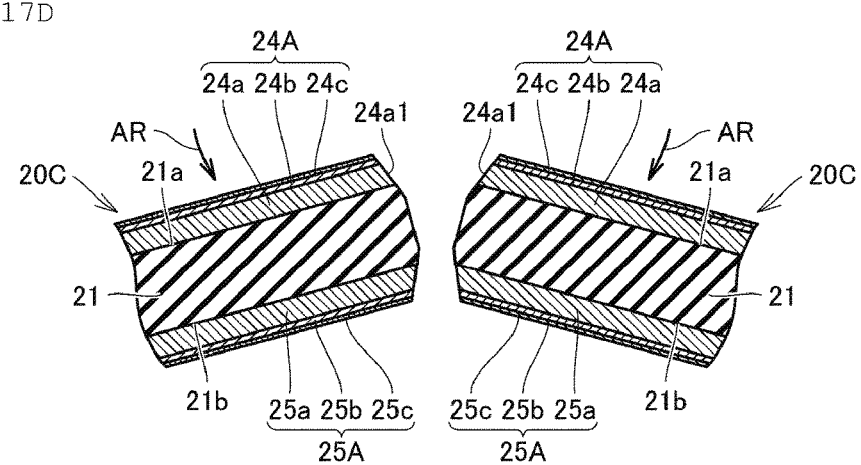

Next, as illustrated in FIG. 17D, the mother substrate 121' is cut by applying a force along the direction of the arrow AR shown in the drawing on the mother substrate 121' formed with the groove 129b. As a result, the mother substrate 121' is separated into separate pieces, and the first and second upper surface conductors 24A, 24B in which the lateral surface 24a1 of the underlying conductive layer 24a is not covered with the covering conductive layers 24b, 24c and is exposed are formed. In this manner, manufacturing of the resistance element 20C is completed.

Preferred Embodiment 4

Figure 18:
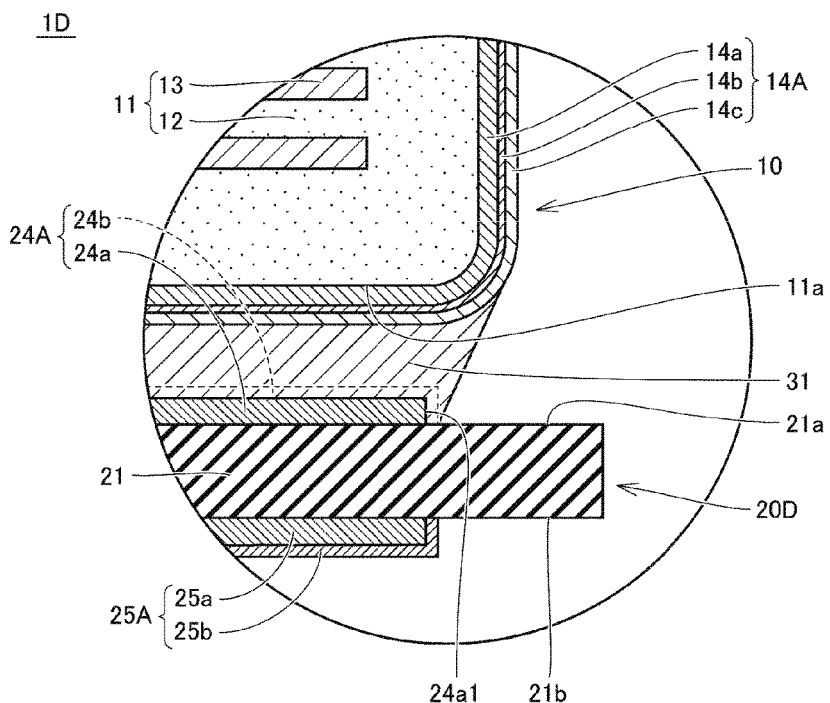
FIG. 18 is an enlarged schematic section view of a portion of a composite electronic component according to Preferred Embodiment 4 of the present invention.

FIG. 18 is an enlarged schematic section view of a portion of a composite electronic component 1D according to Preferred Embodiment 4 of the present invention. Hereinafter, referring to FIG. 18, the composite electronic component 1D according to the present preferred embodiment will be described.

As illustrated in FIG. 18, the composite electronic component 1D includes a resistance element 20D having a structure of the first and second upper surface conductors 24A, 24B different from that of the resistance element 20A of the composite electronic component 1A according to Preferred Embodiment 1. The material of the conductive layers of the first and second upper surface conductors 24A, 24B of the resistance element 20D differs from that in the composite electronic component 1A.

Specifically, the first and second upper surface conductors 24A, 24B include a plurality of conductive layers including the underlying conductive layer 24a which is a Cu layer, and the covering conductive layer 24b which is a Sn layer. In FIG. 18, only the first upper surface conductor 24A is shown. The underlying conductive layer 24a which is a Cu layer is formed of a sintered metal layer formed, for example, by baking a Cu paste, and the covering conductive layer 24b which is a Sn layer is formed, for example, of a plating layer. The covering conductive layer 24b which is a Sn layer is dispersed in the first and second joint materials 31, 32 and integrated therewith when solder is used as the first and second joint materials 31, 32.

Consequently, after mounting of the capacitor element 10 on the resistance element 20D, regarding the underlying conductive layer 24a which is a Cu layer of the first and second upper surface conductors 24A, 24B, not only the upper surface thereof is covered with the first and second joint materials 31, 32, but also the lateral surface 24a1 thereof is covered with the first and second joint materials 31, 32. FIG. 18 shows the state that the lateral surface 24a1 of the underlying conductive layer 24a of the first upper surface conductor 24A is covered with the first joint material 31.

Also with such a structure, since the lateral surface 24a1 of the underlying conductive layer 24a which is a Cu layer is covered with the first and second joint materials 31, 32 as a protective metal film little containing Ag and Cu, it is possible to prevent the deterioration in insulation resistance between upper surface conductors likewise the case of Preferred Embodiment 1.

Preferred Embodiment 5

Figure 19:
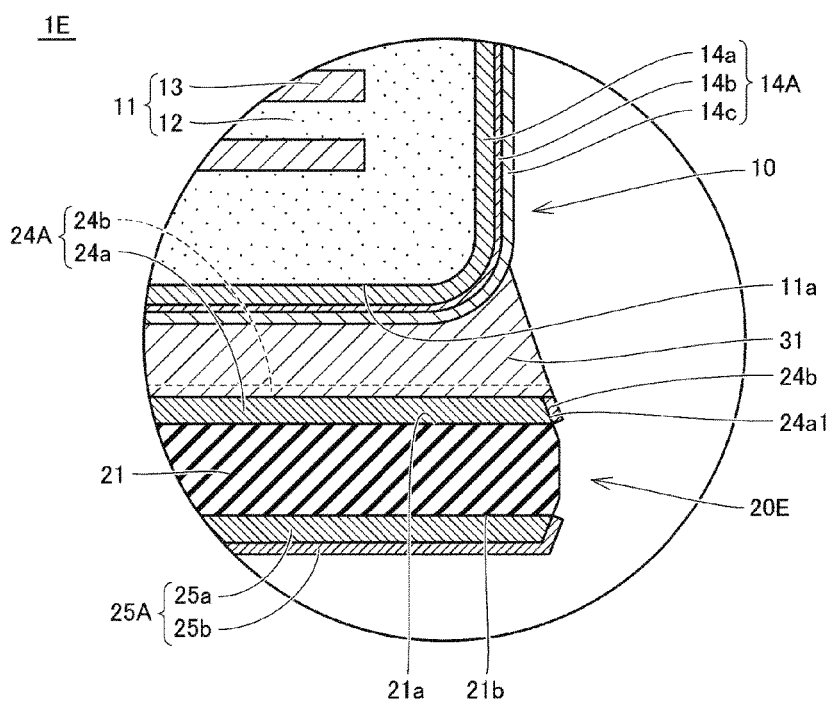
FIG. 19 is an enlarged schematic section view of a portion of a composite electronic component according to Preferred Embodiment 5 of the present invention.

FIG. 19 is an enlarged schematic section view of a portion of a composite electronic component 1E according to Preferred Embodiment 5 of the present invention. Hereinafter, referring to FIG. 19, the composite electronic component 1E according to the present preferred embodiment will be described.

As illustrated in FIG. 19, the composite electronic component 1E includes a resistance element 20E having a structure of the first and second upper surface conductors 24A, 24B different from that of the resistance element 20B of the composite electronic component 1B according to Preferred Embodiment 2. The material of the conductive layers of the first and second upper surface conductors 24A, 24B of the resistance element 20E is different from that in the composite electronic component 1B, and is identical to that in the composite electronic component 1D according to Preferred Embodiment 4.

Specifically, the first and second upper surface conductors 24A, 24B include a plurality of conductive layers including the underlying conductive layer 24a which is a Cu layer, and the covering conductive layer 24b which is a Sn layer. In FIG. 19, only the first upper surface conductor 24A is shown. A portion of the covering conductive layer 24b which is a Sn layer is dispersed in the first and second joint materials 31, 32 and integrated therewith when solder is used as the first and second joint materials 31, 32.

Consequently, after mounting of the capacitor element 10 on the resistance element 20E, regarding the underlying conductive layer 24a which is a Cu layer of the first and second upper surface conductors 24A, 24B, not only the upper surface thereof is covered with the first and second joint materials 31, 32, but also the lateral surface 24a1 thereof is covered with the covering conductive layer 24b. FIG. 19 shows the state that the lateral surface 24a1 of the underlying conductive layer 24a of the first upper surface conductor 24A is covered with the covering conductive layer 24b.

Also with such a structure, since the lateral surface 24a1 of the underlying conductive layer 24a which is a Cu layer is covered with the covering conductive layer 24b as a protective metal film not containing Ag and Cu, it is possible to prevent the deterioration in insulation resistance between upper surface conductors as is the case with the Preferred Embodiment 2.

Preferred Embodiment 6

Figure 20:
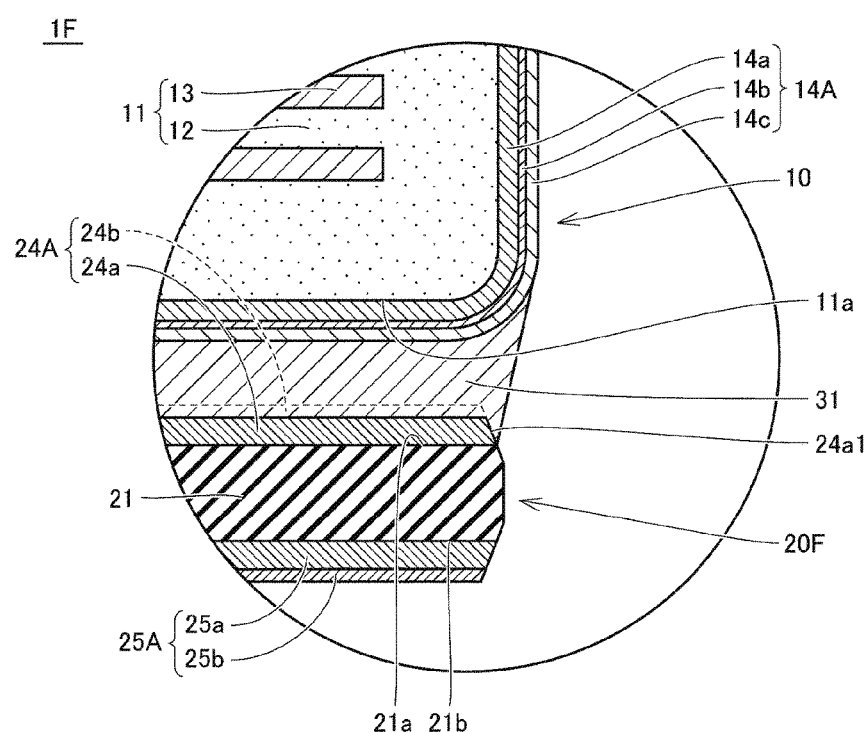
FIG. 20 is an enlarged schematic section view of a portion of a composite electronic component according to Preferred Embodiment 6 of the present invention.

FIG. 20 is an enlarged schematic section view of a portion of a composite electronic component 1F according to Preferred Embodiment 6 of the present invention. Hereinafter, referring to FIG. 20, the composite electronic component 1F according to the present preferred embodiment will be described.

As illustrated in FIG. 20, the composite electronic component 1F includes a resistance element 20F having a structure of the first and second upper surface conductors 24A, 24B different from that of the resistance element 20C of the composite electronic component 10 according to Preferred Embodiment 3. The material of the conductive layers of the first and second upper surface conductors 24A, 24B of the resistance element 20F is different from that in the composite electronic component 10, and is identical to that in the composite electronic component 1D according to Preferred Embodiment 4.

Specifically, the first and second upper surface conductors 24A, 24B include a plurality of conductive layers including the underlying conductive layer 24a which is a Cu layer, and the covering conductive layer 24b which is a Sn layer. In FIG. 20, only the first upper surface conductor 24A is shown. The covering conductive layer 24b which is a Sn layer is dispersed in the first and second joint materials 31, 32 and integrated therewith when solder is used as the first and second joint materials 31, 32.

Consequently, after mounting of the capacitor element 10 on the resistance element 20F, regarding the underlying conductive layer 24a which is a Cu layer of the first and second upper surface conductors 24A, 24B, not only the upper surface thereof is covered with the first and second joint materials 31, 32, but also the lateral surface 24a1 thereof is covered with the first and second joint materials 31, 32. FIG. 20 shows the state that the lateral surface 24a1 of the underlying conductive layer 24a of the first upper surface conductor 24A is covered with the first joint material 31.

Also similar to Preferred Embodiment 3, the lateral surface 24a1 of the underlying conductive layer 24a overlaps the first external electrode 14A in view from the height direction H, and is inclined with respect to the height direction H. Therefore, the lateral surface 24a1 of the underlying conductive layer 24a of the first and the second upper surface conductors 24A, 24B is easily covered with the first and second joint materials 31, 32, respectively.

Also with such a structure, since the lateral surface 24a1 of the underlying conductive layer 24a which is a Cu layer is covered with the first and second joint materials 31, 32 as a protective metal film little containing Ag and Cu, it is possible to prevent the deterioration in insulation resistance between upper surface conductors likewise the case of Preferred Embodiment 3.

Preferred Embodiment 7

Figure 21A:
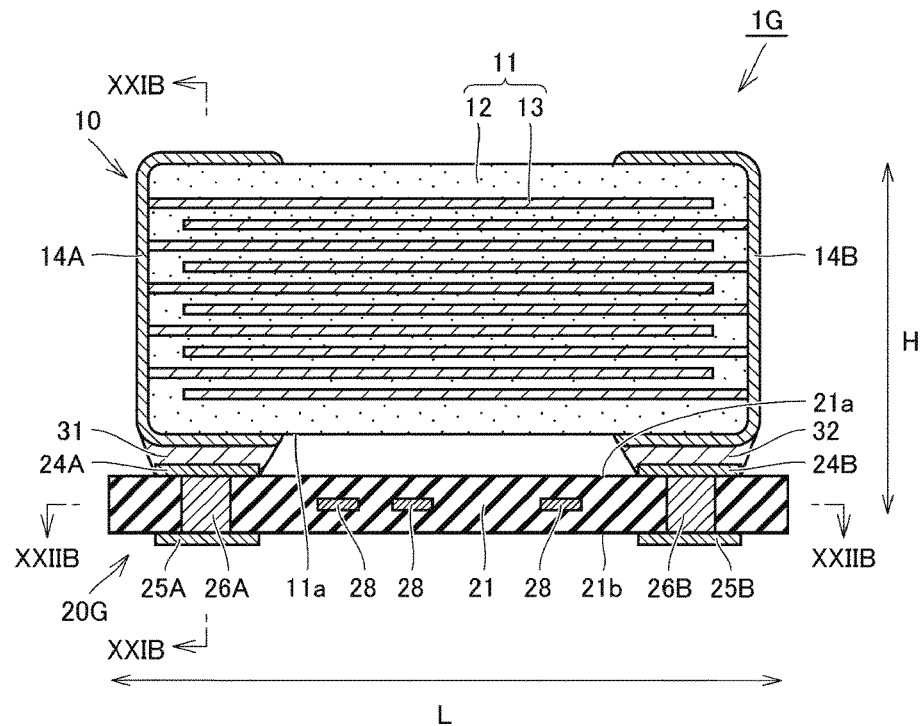
FIGS. 21A and 21B are schematic section views of a composite electronic component according to Preferred Embodiment 7 of the present invention.
Figure 21B:
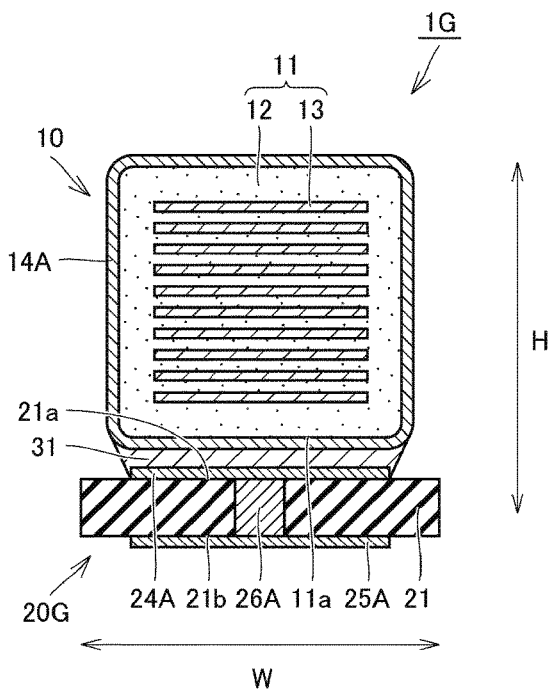
Figure 22A:
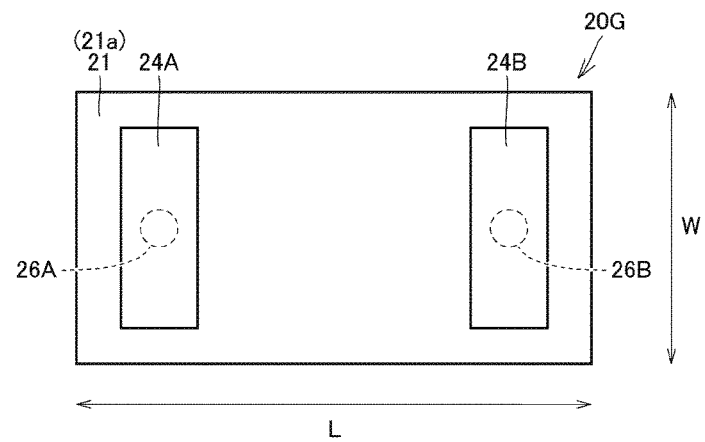
FIGS. 22A-22C are schematic top view, a schematic section view and a schematic bottom view of the inductor element shown in FIG. 21.
Figure 22B:
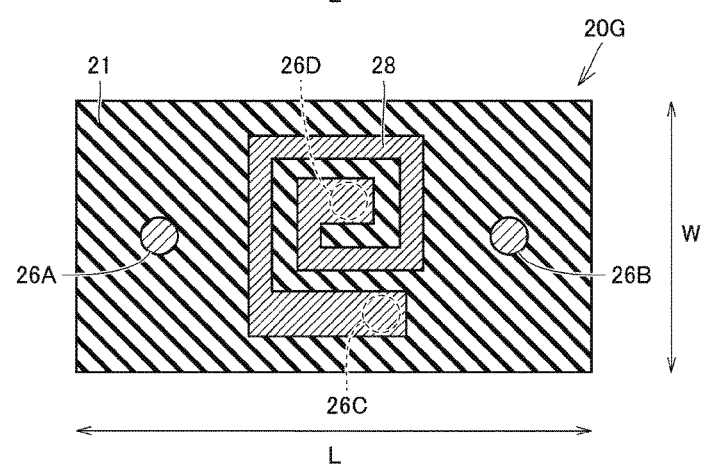
Figure 22C:
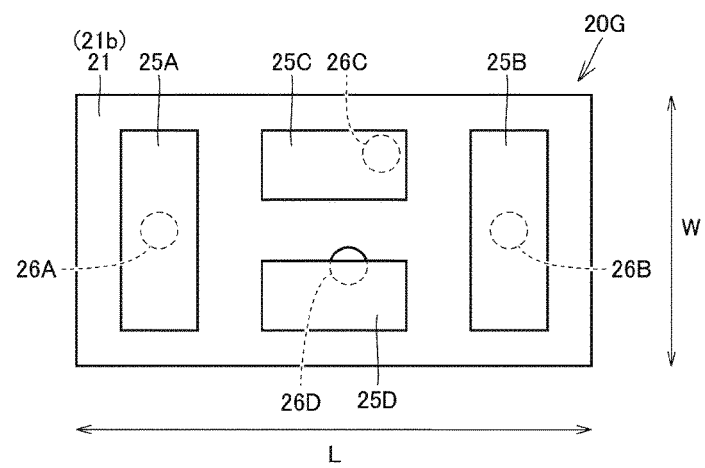

FIG. 21A and FIG. 21B are schematic section views of a composite electronic component 1G according to Preferred Embodiment 7 of the present invention, and FIG. 22A to FIG. 22C are a schematic top view, a section view and a bottom view of the inductor element shown in FIGS. 21A and 21B. FIG. 21B is a schematic section view of the case where the composite electronic component 1G according to the present preferred embodiment is cut along the line XXIB-XXIB shown in FIG. 21A, and FIG. 22B is a schematic section view of the case where the composite electronic component 1G according to the present preferred embodiment is cut along the line XXIIB-XXIIB shown in FIG. 21A. Hereinafter, referring to FIGS. 21A, 21A, and 22A-22C, the composite electronic component 1G according to the present preferred embodiment will be described.

As illustrated in FIGS. 21A and 21B, the composite electronic component 1G is different from the composite electronic component 1A according to Preferred Embodiment 1 in that the first electronic element which is a substrate-type electronic element is not a resistance element, but is an inductor element 20G.

As illustrated in FIGS. 21A-22C, the inductor element 20G has the insulating base member 21, inductor wiring 28, the first and second upper surface conductors 24A, 24B, the first to fourth lower surface conductors 25A-25D, and the first to fourth via conductors 26A-26D.

The inductor wiring 28 preferably is embedded wiring in the base member 21, and has a spiral shape in plan view from the height direction H. The outer circumferential end portion of the inductor wiring 28 is connected with the third via conductor 26C, and the inner circumferential end portion is connected with the fourth via conductor 26D. Also, both of the third and fourth via conductors 26C, 26D extend from the inductor wiring 28 toward the lower surface 21b of the base member 21, and are connected with the third and fourth lower surface conductors 25C, 25D disposed on the lower surface 21b of the base member 21, respectively. The inductor wiring 28 may include a plurality of inductor wiring layers laminated in the height direction H.

The structures of the first and second upper surface conductors 24A, 24B, the first and second lower surface conductors 25A, 25B and the first and second via conductors 26A, 26B are preferably identical to those in Preferred Embodiment 1, and especially, the material of the conductive layers of the first and second upper surface conductors 24A, 24B, and the joining structures between the first and second upper surface conductors 24A, 24B and the first and second joint materials 31, 32 are preferably identical to those in Preferred Embodiment 1.

Therefore, also with such a structure, it is possible to effectively prevent the occurrence of an electric short circuit between upper surface conductors as is the case with Preferred Embodiment 1.

In Preferred Embodiments 1 to 7 of the present invention, while the description was made by illustrating the case where the lower conductive layer is covered with the protective metal film throughout the entire periphery of the lateral surface of the first and second upper surface conductors, the entire periphery of the lateral surface is not necessarily covered with the protective metal film, and only a portion thereof may be covered with the protective metal film. Also with such a structure, it is possible to prevent the deterioration in insulation resistance between upper surface conductors.

In Preferred Embodiments 1 to 7 of the present invention, the description was made by illustrating the case where a LTCC substrate is used as the base member of the first electronic element which is a substrate-type electronic element. In that case, it is preferred that the first and second upper surface conductors include a plurality of conductors including an Ag layer which is an underlying conductive layer, a Ni layer which is a covering conductive layer, and an Au layer which is a covering conductive layer, or including a plurality of conductors including a Cu layer which is an underlying conductive layer and a Sn layer which is a covering conductive layer as described above. However, not limited to this, the first and second upper surface conductors can be made up of a plurality of conductors including an Ag layer which is an underlying conductive layer, a Ni layer which is a covering conductive layer, and a Sn layer which is a covering conductive layer.

When a glass epoxy substrate, an alumina substrate or a silicon substrate is used as the base member of the first electronic element which is a substrate-type electronic element, it is preferred to provide the first and second upper surface conductors with a plurality of conductive layers including a Cu layer which is an underlying conductive layer, and a Sn layer which is a covering conductive layer.

Further, these conductive layers are not limited to the sintered metal layer and plating layer, and may be a metal vapor deposition layer formed by the vapor deposition method or a sputtered layer formed by the sputtering method.

In any case, it is preferred to select the material of the covering conductive layer and the material of the joint material in consideration of the electrical and mechanical connection reliability with the joint material in the case where an Ag layer or a Cu layer is used as an underlying conductive layer considering the sufficient conductivity, and in that case, it is only required to cover the lateral surface of the underlying conductive layer with a protective conductive layer (covering conductive layer or joint material), and to select metal other than Ag and Cu as the metal component that is maximum in weight ratio contained in the protective metal film. In this case, the metal component that is maximum in weight ratio contained in the protective metal film is preferably any one of Sn, Ni, Au and Pb.

For identifying the metal component that is maximum in weight ratio contained in a protective metal film or a conductive layer, a known analytical method can be used, and for example, elementary analysis by a wavelength-dispersive X-ray analyzer (WDX) attached to scanning electron microscope (SEM) can be used.

In Preferred Embodiments 1 to 7 of the present invention, while the description was made by illustrating the case where the direction of lamination of the dielectric layers and the internal electrode layers of the capacitor body of the capacitor element is coincident with the height direction of the composite electronic component, it is possible that the direction of lamination is coincident with the width direction of the composite electronic component.

In Preferred Embodiments 1 to 7 of the present invention, while the description was made by illustrating the case where a multilayer ceramic capacitor is used as the capacitor element to be incorporated into the composite electronic component, it is also possible to incorporate other kind of capacitor element into the composite electronic component in place of the multilayer ceramic capacitor.

In Preferred Embodiments 1 to 7 of the present invention, while the description was made by illustrating the case where a resistance element or an inductor element is used as a substrate-type first electronic element, the substrate-type first electronic element may be another electronic component such as a thermistor element or a piezoelectric element. Also the second electronic element mounted on the substrate-type first electronic element may be an electronic element other than the aforementioned capacitor element.

Further, characteristic structures and features of Preferred Embodiments 1 to 7 of the present invention can be mutually combined without departing from the scope of the present invention.

Thus, the preferred embodiments and modified examples thereof described herein are merely illustrative in every point, and are not restrictive.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A composite electronic component comprising:
a first electronic element;
a second electronic element mounted on the first electronic element in a height direction; and
a joint material joining the first electronic element and the second electronic element; wherein
the first electronic element functions as a passive element and includes an insulating base member including an upper surface intersecting with the height direction, and an upper surface conductor disposed on the upper surface of the base member;
the second electronic element includes an element body including a lower surface facing the upper surface of the base member in the height direction, and a terminal conductor disposed on at least a portion of the lower surface of the element body;
the joint material joins at least a portion of the upper surface conductor and at least a portion of the terminal conductor;
the upper surface conductor includes a conductive layer containing Ag or Cu as a metal component that is maximum in weight ratio;
at least a portion of the lateral surface of the conductive layer is covered with a protective metal film; and
the metal component that is maximum in weight ratio contained in the protective metal film is a metal other than Ag and Cu.

2. The composite electronic component according to claim 1, wherein the metal component that is maximum in weight ratio contained in the protective metal film is any one of Sn, Ni, Au and Pb.

3. The composite electronic component according to claim 1, wherein the protective metal film is a covering conductive layer that covers the upper surface and the lateral surfaces of the conductive layer contained in the upper surface conductor.

4. The composite electronic component according to claim 3, wherein the protective metal film is a plating layer.

5. The composite electronic component according to claim 1, wherein the protective metal film is part of the joint material.

6. The composite electronic component according to claim 1, wherein the upper surface conductor is smaller than the terminal conductor in any directions orthogonal to the height direction.

7. The composite electronic component according to claim 1, wherein a thickness of the upper surface conductor is greater than or equal to about 5 µm.

8. The composite electronic component according to claim 1, wherein
the upper surface conductor includes a first upper surface conductor and a second upper surface conductor that are separated from each other in a length direction orthogonal to the height direction, and a third upper surface conductor located between the first upper surface conductor and the second upper surface conductor;
the terminal conductor includes a first terminal conductor and a second terminal conductor that are separated from each other in the length direction;
the first terminal conductor is joined with the first upper surface conductor by the joint material; and
the second terminal conductor is joined with the second upper surface conductor by the joint material.

9. The composite electronic component according to claim 8, wherein
the first upper surface conductor is located between each end of the first terminal conductor in a width direction orthogonal to the height direction and the length direction;
the second upper surface conductor is located between each end of the second terminal conductor in the width direction;
of the lateral surfaces of the first upper surface conductor, the lateral surface orthogonal to the width direction is covered with the protective metal film; and
of the lateral surfaces of the second upper surface conductor, the lateral surface orthogonal to the width direction is covered with the protective metal film.

10. The composite electronic component according to claim 9, wherein a dimension in the width direction of the base member is larger than a dimension in the width direction of the second electronic element.

11. The composite electronic component according to claim 8, wherein
the first upper surface conductor is located between an outer end of the first terminal conductor and an outer end of the second terminal conductor in the length direction;
the second upper surface conductor is located between the outer end of the first terminal conductor and the outer end of the second terminal conductor in the length direction;
of the lateral surfaces of the first upper surface conductor, the lateral surface orthogonal to the length direction is covered with the protective metal film; and
of the lateral surfaces of the second upper surface conductor, the lateral surface orthogonal to the length direction is covered with the protective metal film.

12. The composite electronic component according to claim 11, wherein a dimension in the length direction of the base member is larger than a dimension in the length direction of the second electronic element.

13. The composite electronic component according to claim 8, wherein
the element body includes a plurality of dielectric layers and a plurality of conductive layers that are laminated; and
the first electronic element includes a resistor that is disposed on the upper surface of the base member and connected with the third upper surface conductor.

14. The composite electronic component according to claim 13, wherein
the upper surface conductor includes a fourth upper surface conductor located between the first upper surface conductor and the second upper surface conductor; and
the resistor is connected with the fourth upper surface conductor.

15. The composite electronic component according to claim 1, wherein
the upper surface conductor includes a first upper surface conductor and a second upper surface conductor that are separated from each other in a length direction orthogonal to the height direction;
the terminal conductor includes a first terminal conductor and a second terminal conductor that are separated from each other in the length direction;
the first terminal conductor is joined with the first upper surface conductor by the joint material;
the second terminal conductor is joined with the second upper surface conductor by the joint material;
the first electronic element includes a lower surface conductor disposed on the lower surface thereof opposite to the upper surface of the base member;
the lower surface conductor includes a first lower surface conductor and a second lower surface conductor that are separated from each other in the length direction, and a third lower surface conductor located between the first lower surface conductor and the second lower surface conductor;
the element body includes a plurality of dielectric layers and a plurality of conductive layers that are laminated; and
the first electronic element includes inductor wiring that is disposed inside the base member and is electrically connected with the third lower surface conductor.

16. The composite electronic component according to claim 15, wherein
the lower surface conductor includes a fourth lower surface conductor located between the first lower surface conductor and the second lower surface conductor; and
the inductor wiring is electrically connected with the fourth lower surface conductor.

* * * * *